(12) United States Patent
Yi et al.

(10) Patent No.: US 11,690,051 B2
(45) Date of Patent: Jun. 27, 2023

(54) METHOD AND APPARATUS FOR CONFIGURING FRAME STRUCTURE FOR NEW RADIO ACCESS TECHNOLOGY IN WIRELESS COMMUNICATION SYSTEM

(71) Applicant: LG Electronics Inc., Seoul (KR)

(72) Inventors: Yunjung Yi, Seoul (KR); Byounghoon Kim, Seoul (KR); Kijun Kim, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 494 days.

(21) Appl. No.: 16/097,525

(22) PCT Filed: May 2, 2017

(86) PCT No.: PCT/KR2017/004673
§ 371 (c)(1),
(2) Date: Oct. 29, 2018

(87) PCT Pub. No.: WO2017/188803
PCT Pub. Date: Nov. 2, 2017

(65) Prior Publication Data
US 2019/0132838 A1    May 2, 2019

Related U.S. Application Data

(60) Provisional application No. 62/373,960, filed on Aug. 11, 2016, provisional application No. 62/339,093,
(Continued)

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 5/0007* (2013.01); *H04L 5/0023* (2013.01);
(Continued)

(58) Field of Classification Search
CPC ............. H04W 72/0446; H04L 5/0053; H04L 5/0055; H04L 5/0044; H04L 27/2602;
(Continued)

(56) References Cited

U.S. PATENT DOCUMENTS

2011/0110305 A1* 5/2011 Wang .................... H04W 28/06
370/328
2011/0280202 A1  11/2011 Lee et al.
(Continued)

FOREIGN PATENT DOCUMENTS

WO    2015078772    6/2015

*Primary Examiner* — Un C Cho
*Assistant Examiner* — Lalita W Pace
(74) *Attorney, Agent, or Firm* — Fish & Richardson P.C.

(57) ABSTRACT

A network node configures a frame structure for a new radio access technology (RAT). The network nodes configures a frame including a fixed number of subframes, each of
(Continued)

subframe including at least one resource unit (RU) based on a numerology, and schedules a channel in the frame by using a reference timing corresponding to a subframe.

22 Claims, 23 Drawing Sheets

Related U.S. Application Data filed on May 20, 2016, provisional application No. 62/329,992, filed on Apr. 29, 2016.

(51) Int. Cl.
*H04L 27/26* (2006.01)
*H04B 7/06* (2006.01)

(52) U.S. Cl.
CPC .......... *H04L 5/0044* (2013.01); *H04L 5/0053* (2013.01); *H04L 5/0055* (2013.01); *H04L 5/0064* (2013.01); *H04L 27/26025* (2021.01); *H04B 7/0617* (2013.01)

(58) Field of Classification Search
CPC ... H04L 5/0023; H04L 5/0007; H04L 5/0064; H04L 27/26025; H04B 7/0617
See application file for complete search history.

(56) References Cited

U.S. PATENT DOCUMENTS

| | | | |
|---|---|---|---|
| 2013/0034073 A1* | 2/2013 | Aiba | H04L 1/1887 370/329 |
| 2013/0194931 A1 | 8/2013 | Lee et al. | |
| 2013/0315168 A1 | 11/2013 | Frank et al. | |
| 2013/0343314 A1 | 12/2013 | Tirola et al. | |
| 2015/0327226 A1* | 11/2015 | Cheng | H04W 74/08 370/329 |
| 2015/0334702 A1* | 11/2015 | Ji | H04W 72/0446 370/280 |
| 2016/0182213 A1* | 6/2016 | Golitschek Edler von Elbwart | H04L 5/22 370/294 |
| 2016/0227523 A1* | 8/2016 | Desai | H04L 5/001 |
| 2016/0234878 A1* | 8/2016 | Svedman | H04W 8/005 |
| 2017/0207884 A1* | 7/2017 | Jiang | H04L 1/1835 |
| 2017/0238305 A1* | 8/2017 | Chen | H04L 5/0082 370/311 |
| 2017/0273011 A1* | 9/2017 | Rico Alvarino | H04W 4/70 |
| 2017/0310431 A1* | 10/2017 | Iyer | H04L 1/1816 |
| 2017/0311276 A1* | 10/2017 | Tsai | H04B 7/0617 |
| 2018/0007673 A1* | 1/2018 | Fwu | H04W 4/70 |
| 2018/0279388 A1* | 9/2018 | Miao | H04W 76/10 |
| 2018/0287742 A1* | 10/2018 | Feng | H04L 1/1812 |
| 2019/0254014 A1* | 8/2019 | Martin | H04L 5/0044 |
| 2020/0008181 A1* | 1/2020 | Hwang | H04L 1/0009 |

* cited by examiner

METHOD AND APPARATUS FOR CONFIGURING FRAME STRUCTURE FOR NEW RADIO ACCESS TECHNOLOGY IN WIRELESS COMMUNICATION SYSTEM

CROSS-REFERENCE TO RELATED APPLICATIONS

This application is a National Stage application under 35 U.S.C. § 371 of International Application No. PCT/KR2017/ 004673, filed on May 2, 2017, which claims the benefit of U.S. Provisional Application No. 62/373,960, filed on Aug. 11, 2016, U.S. Provisional Application No. 62/339,093, filed on May 20, 2016, and U.S. Provisional Application No. 62/329,992, filed on Apr. 29, 2016. The disclosures of the prior applications are incorporated by reference in their entirety.

TECHNICAL FIELD

The present invention relates to wireless communications, and more particularly, to a method and apparatus for configuring a frame structure for a new radio access technology (RAT) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/ latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience.

In the new RAT, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating new RAT efficiently, various schemes have been discussed. Specifically, a new frame structure may need to be required.

DISCLOSURE OF INVENTION

Technical Problem

The present provides a method and apparatus for configuring a frame structure for a new radio access technology (RAT) in a wireless communication system. The present invention discusses a few mechanisms to define frame structure for new RAT, which allows multiplexing of different numerology with different subcarrier spacing and orthogonal frequency division multiplexing (OFDM) symbol length, and support optionally different use cases.

Solution to Problem

In an aspect, a method for configuring a frame structure by a network node in a wireless communication system is provided. The method includes configuring a frame including a fixed number of subframes, each of subframe including at least one resource unit (RU) based on a numerology, and scheduling a channel in the frame by using a reference timing corresponding to a subframe.

In another aspect, a network node in a wireless communication system is provided. The method includes a memory, a transceiver, and a processor, coupled to the memory and the transceiver, that configures a frame including a fixed number of subframes, each of subframe including at least one resource unit (RU) based on a numerology, and schedules a channel in the frame by using a reference timing corresponding to a subframe.

Advantageous Effects of Invention

New frame structure can be configured for new RAT.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
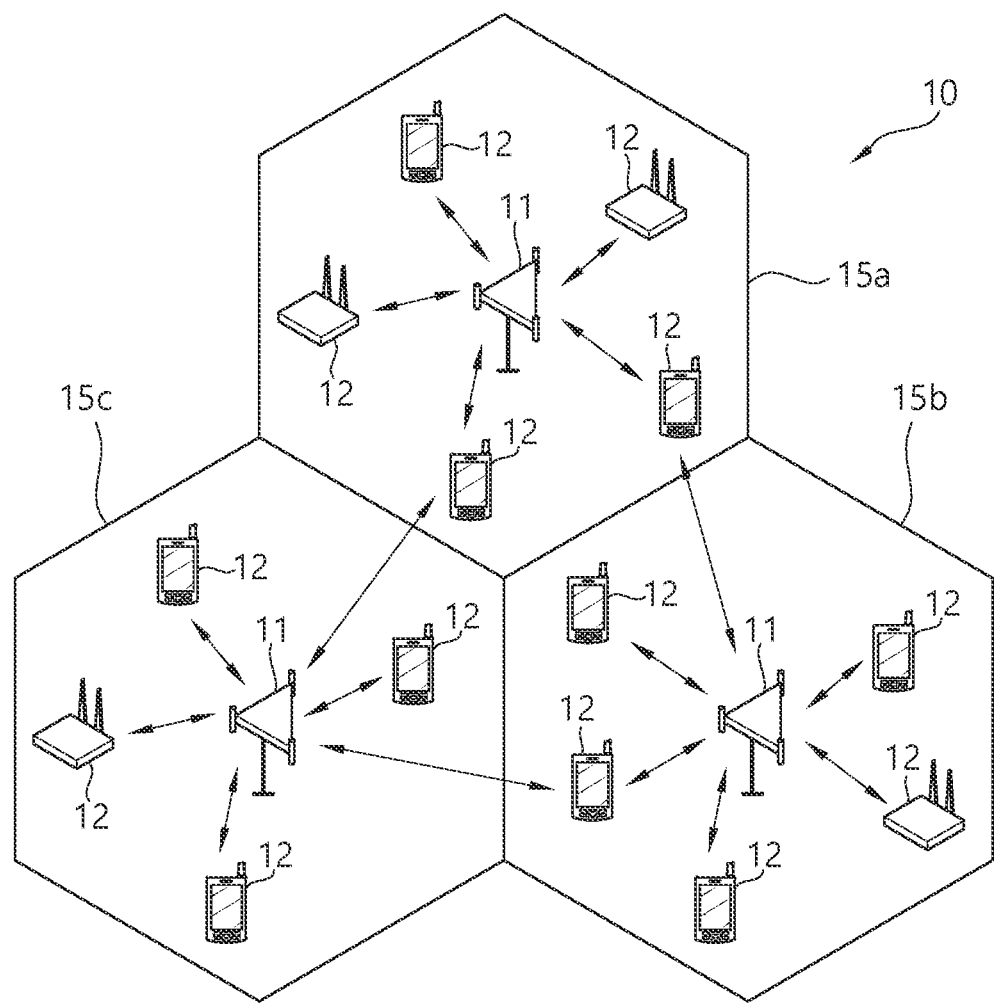
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
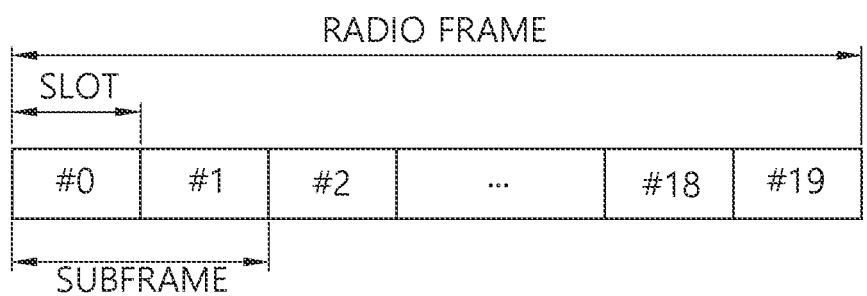
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

Figure 3:
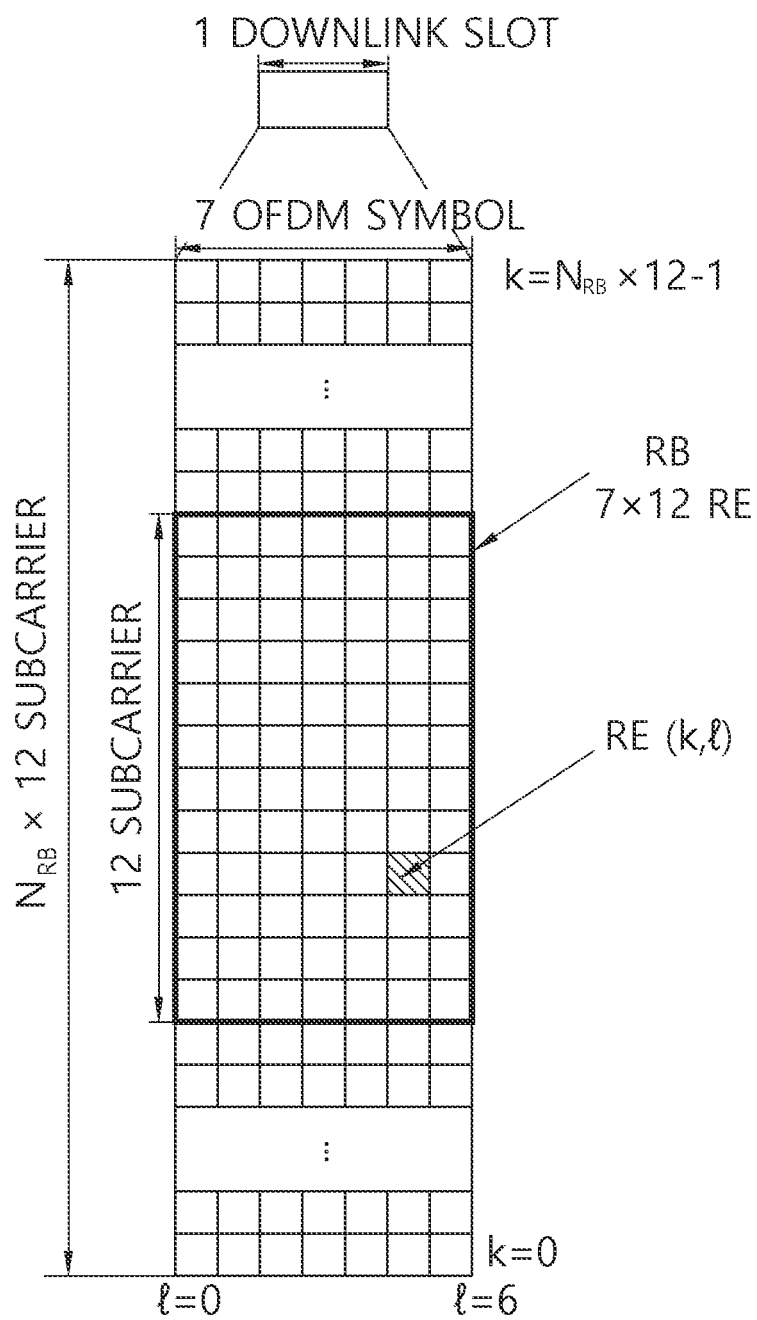
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12?7 or 12?14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, and 2048 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (RAT).

It is expected that different frame structure may be necessary for the new RAT. Particularly, different frame structure in which UL and DL may be present in every subframe or may change very frequently in the same carrier may be necessary for the new RAT. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In the new RAT, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in the new RAT, the following subframe types may be considered to support the paired spectrum and the unpaired spectrum mentioned above.

(1) Subframes including DL control and DL data (2) Subframes including DL control, DL data, and UL control (3) Subframes including DL control and UL data (4) Subframes including DL control, UL data, and UL control (5) Subframes including access signals or random access signals or other purposes.

(6) Subframes including both DL/UL and all UL signals.

However, the subframe types listed above are only exemplary, and other subframe types may also be considered.

Figure 4:
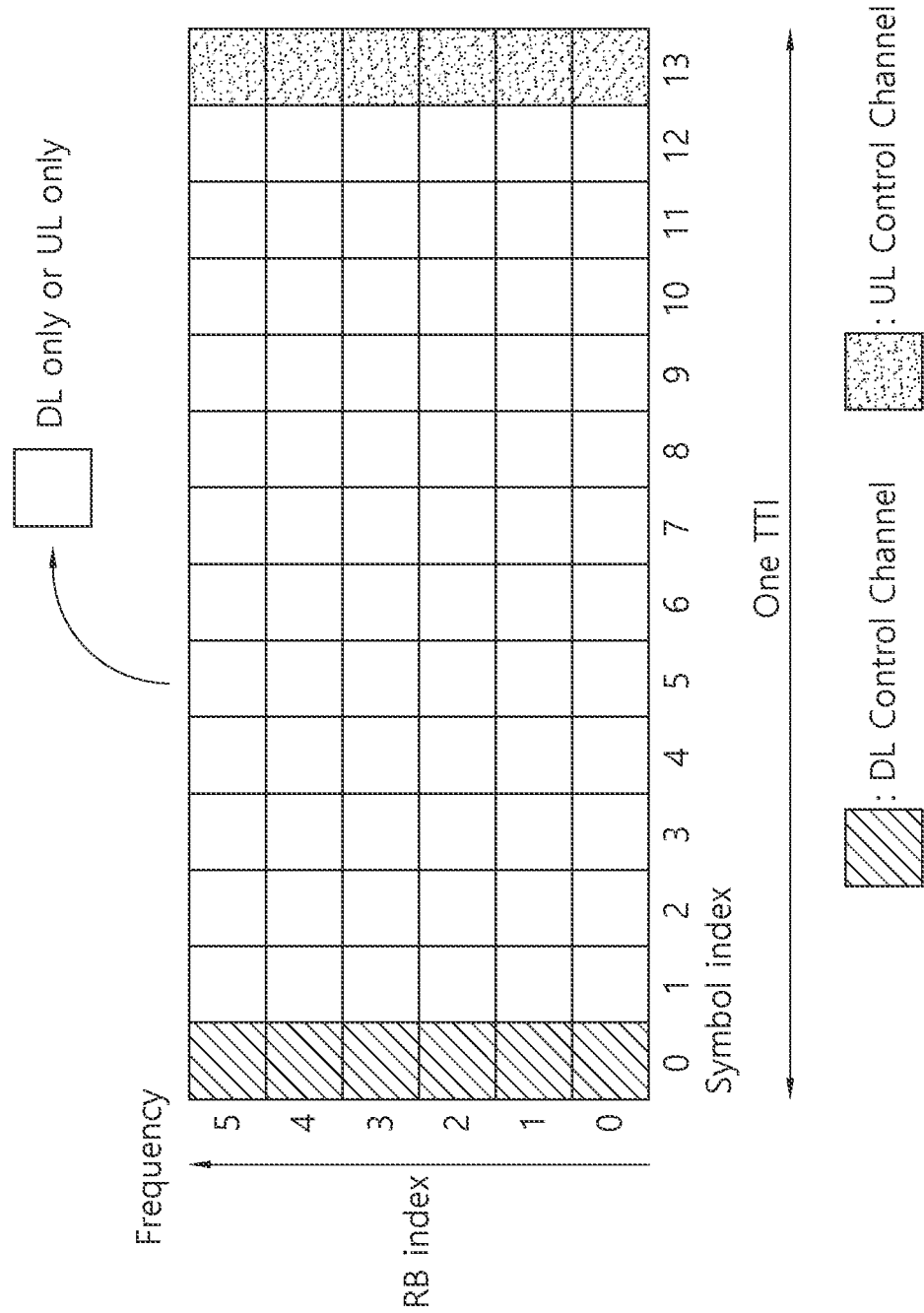
FIG. 4 shows an example of subframe type for new RAT.

FIG. 4 shows an example of subframe type for new RAT. The subframe shown in FIG. 4 may be used in TDD system of new RAT, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

In the new RAT, it is expected that different services are supported in the same frequency. For example, enhanced mobile broadband (eMBB) and mMTC can be supported simultaneously in the same frequency. Or, eMBB and ultra-reliable low latency communication (URLLC) can be supported simultaneously in the same frequency. Or, eMBB and enhanced vehicle-to-everything (eV2X) communication can be supported simultaneously in the same frequency. It is yet unclear whether there will be one eNB supporting different services or multiple eNBs supporting different services or combination of services. Furthermore, different service may require different numerology, due to respective required CP length and/or multiplexing capacity and/or radio frequency (RF) bandwidth of the supporting UEs.

Nonetheless, to allow different services simultaneously in the same frequency, in perspective of one service, there may be unusable or unavailable resources which may be configured semi-statically or dynamically. Hereinafter, the present invention discusses a few mechanisms to support different services effectively in perspective of both the network and UE. Similar to the network, in perspective of UE, it is likely that one UE may also support different services simultaneously. Depending on the mechanisms of different services, a UE may support different services in the same carrier or in different carriers. Particularly, the present invention focuses on frame structure or basic structure to utilize in determining scheduling timing between channels and corresponding actions.

1. Frame Structure Option

At first, definition of basic frame structure needs to be clarified in order to support various numerologies. For convenience, it is assumed in the description below that numerology may be defined as a set of subcarrier spacing and CP length.

(1) Option 1: Frame (10 ms) consists of 10 subframes.

In this option, regardless of numerologies, LTE subframe duration may be kept. For example, subframe may be defined as 1 ms, like the current LTE frame structure. In this case, a frame may consist of fixed number ('m') of subframes, regardless of numerology used in a cell.

Figure 5:
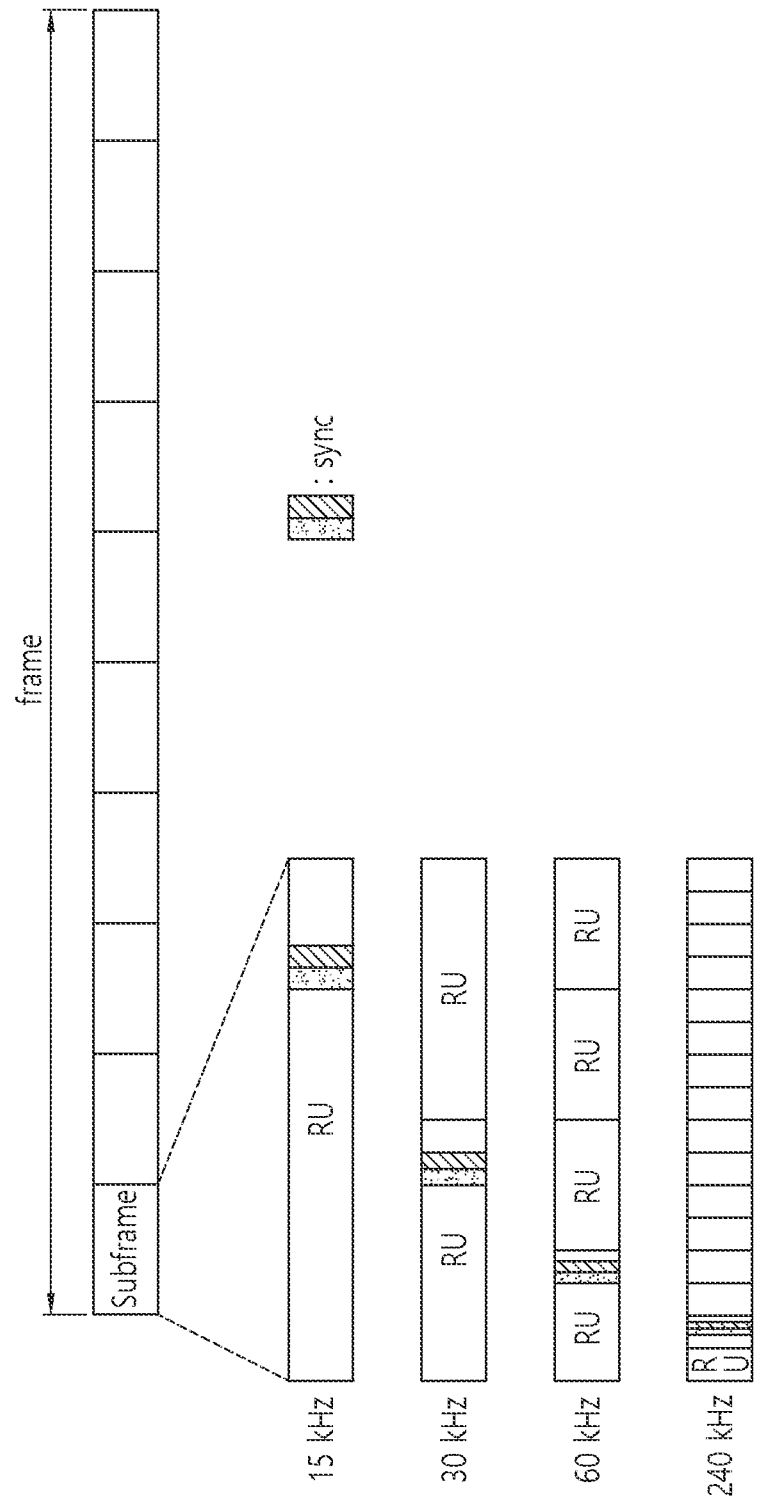
FIG. 5 shows an example of a frame structure according to an embodiment of the present invention.

FIG. 5 shows an example of a frame structure according to an embodiment of the present invention. Referring to FIG. 5, a frame includes 10 subframes of which duration is 1 ms, like current LTE frame structure, regardless of numerology. According to numerology, each subframe may consist of different number of resource units (RUs). RU may be a basic scheduling unit. RU may be referred to as different name, e.g. slot. For 15 kHz subcarrier spacing, each subframe consists of 1 RU. For 30 kHz subcarrier spacing, each subframe consists of 2 RU. For 60 kHz subcarrier spacing, each subframe consists of 4 RU. For 240 kHz subcarrier spacing, each subframe consists of 16 RU.

(2) Option 2: Frame (10 ms) consists of "M" number of subframes.

In this option, subframe duration may be scaled down based on numerologies, which will potentially lead different number of subframes in a given time duration. In each radio frame, there may be different number of subframes. M may be scalable with subcarrier spacing (e.g. M=10 with 15 kHz subcarrier spacing, M=40 with 60 kHz subcarrier spacing). In this option, subframe may be used as a basic scheduling unit of data scheduling and other purpose, instead of RU.

Figure 6:
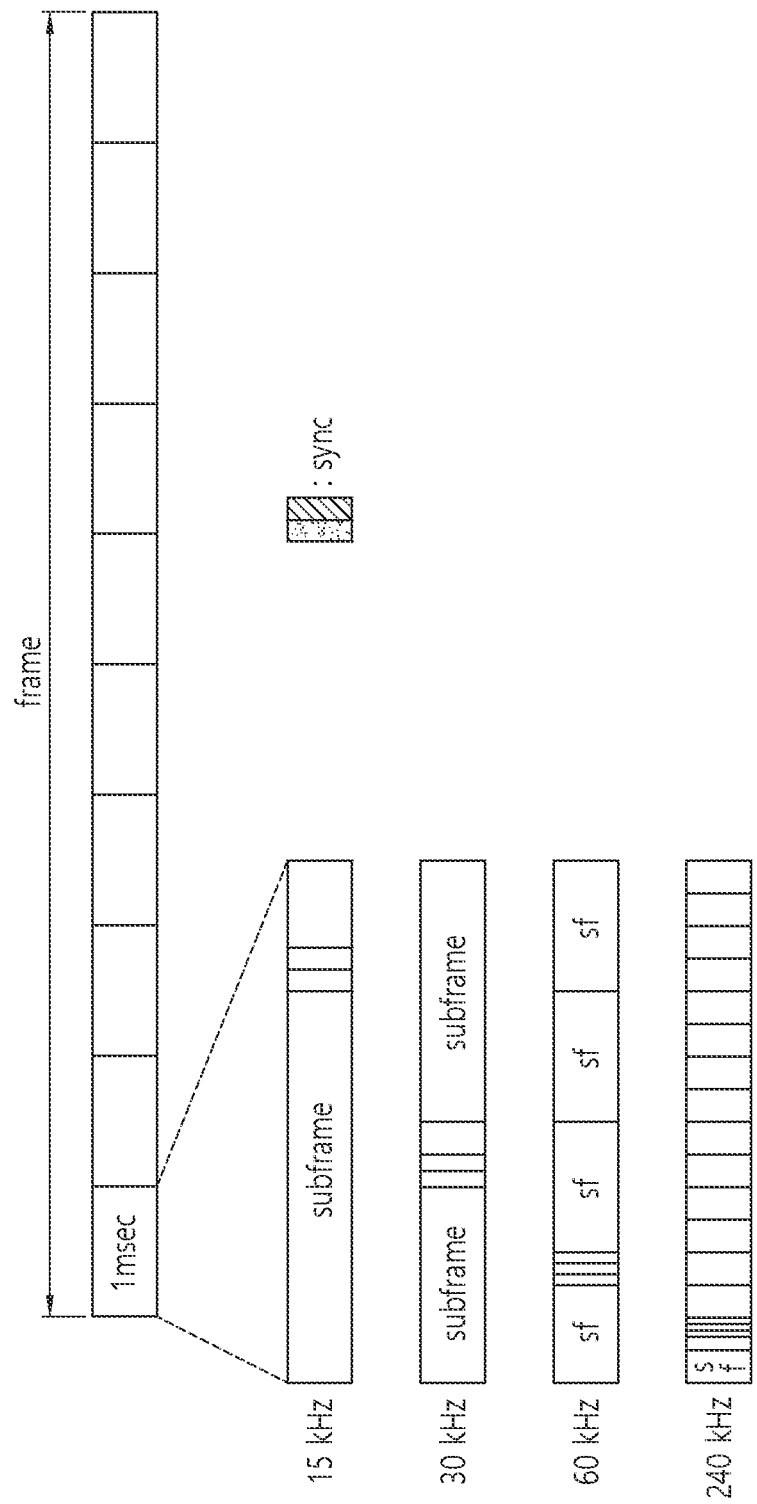
FIG. 6 shows another example of a frame structure according to an embodiment of the present invention.

FIG. 6 shows another example of a frame structure according to an embodiment of the present invention. Referring to FIG. 6, a frame (10 ms) can be divided into a unit of 1 ms, and in each of 1 ms, different number of subframes may be included according to numerology. Subframe may be a basic scheduling unit. For 15 kHz subcarrier spacing, duration of each subframe is 1 ms. For 30 kHz subcarrier spacing, duration of each subframe is ½ ms. For 60 kHz subcarrier spacing, duration of each subframe is ¼ ms. For 240 kHz subcarrier spacing, duration of each subframe is 1/16 ms.

(3) Option 3: Frame (10 msec) consists of 10 subframe groups, and each subframe group consists of "N" number of subframes.

In this option, a subframe group which consists of different number of subframes may be formed to represent a fixed time duration (e.g. 1 ms). N may be scalable with subcarrier spacing (e.g. N=1 with 15 kHz subcarrier spacing, N=44 with 60 kHz subcarrier spacing)

For scheduling DL/UL data/control channel, as well as other reference signal (RS), signal transmission, it may be beneficial to consider a reference timing. For this, subframe may be used as a reference timing. Subframe may consist of "K" number of OFDM symbols and "K" may be a fixed number or a set of fixed numbers (e.g. depending on the CP length) with subcarrier spacing. Further, subframe may consist of 0 to K−1 number of OFDM symbols without loss of generality.

In the description below, where and how OFDM symbol starts (or subframe boundary) in DL/UL resource and/or the relationship between the subframe formation with actual scheduling or resources may be discussed according to the present invention. The present invention described below may be applied to TDD, FDD and flexible duplex. Furthermore, the present invention described below may applied with half-duplex eNB capability in one subband or in a carrier, as well as with full-duplex eNB capability in one subband in a carrier. There may be possibility of providing semi-full-duplex capability which may allow blank duplex gap between DL and UL resources within a subband or within a carrier. For a convenience, this semi-full-duplex capability may be considered as full duplex in the description below.

Further, RU defined in the description below may provide time granularity to schedule a certain channel or a certain combination of channels. The RU may be used as a basic scheduling unit in perspective of the network (or UE). The RUs may be overlapped or non-overlapped with each other depending on the design. In perspective of C-Plane or reference timing, subframe may be used as a basic scheduling unit, whereas the RU may rather be used for actual scheduling and multiplexing of different channels and/or a set of channels. In the description below, the RU may be replaced with different name without loss of generality. For example, the slot may be used as a basic scheduling unit. In this case, the slot does not denote 0.5 ms in the current LTE frame structure, but denotes a basic scheduling unit.

Further, if a cell supports more than one numerologies, absolute time duration of the subframe may be defined by a reference numerology (which may be defined as initial access). In this case, with different numerology, there may be more or less number of OFDM symbols within a subframe.

2. RU Between eNB/UE Communications

Hereinafter, RU for communication between eNB and UE (or between UEs or between eNBs for backhaul link or between eNB and UE via relay link) is described according to an embodiment of the present invention. As it is considered to confine data transmission to smaller resource granularity as much as possible, a concept of RU which may be varied depending on the size of transmission or channel type may be introduced. The benefit of defining RU may be that it can provide efficient mechanism to multiplex different TTI length or different numerologies. Otherwise, handling of different numerologies at different levels of collisions/overlaps need to be individually considered.

To define a size of RU size, at least one of the following options may be considered.

(1) RU may be defined separately in DL channels and UL channels (or DL portion and UL portion in a subframe or over multiple subframes). Among DL channels, RU may have one size. In this case, the size of RU may be same as the size of RB for DL transmission. Or, the size of RU may be the same as the size of subframe. Actual size of RU size where the data is transmitted may be smaller or larger than the size of RB or subframe.

(2) RU may be defined separately per channel (and/or RS and/or signal). For example, the size of RU for control channel may be one or two OFDM symbols, and the size of RU for data channel may be 1 to N, and so on. If this approach is used, the maximum size of RU may be used for determining the size of RU for each channel.

(3) RU may be defined for each set of channels which have tied relationship. An example of the set of channels may be as follows.

DL control+DL data;
UL grant+UL data;
DL control+DL data+ACK/NACK transmission;
ACK/NACK transmission for PDSCH+DL control+DL data;
Random access response (RAR)+Msg 3,
Msg 3+Msg 4,
DL control+initial DL transmission+ACK/NACK+DL control retransmission+DL retransmission+ACK/NACK;
ACK/NACK transmission for PDSCH+eNB processing budget (the starting ACK/NACK transmission time to meet eNB retransmission in the next subframe).

(4) RU may be defined per each set of channels with tight relationship (or sequential procedure channels). The size of RU may be varied depending on actual size of one channel transmission in one set.

The size of RU may be configured or determined based on UE capability and/or use case and/or transport block size (TBS) that a UE can support or can be scheduled with or is scheduled with.

If options (3) or (4) described above are used, any dependency between two different RUs needs to be minimized. For example, due to blank resources or some other ongoing scheduling, etc., if partial resource of one RU becomes unavailable, the handling of availability may be done at the RU level. That is, the entire RU may be unavailable or the entire RU may be available. This may be efficient to override semi-statically configured blank resources or unavailable resources partially. One example of RU may be an aperiodic channel state information (CSI) request+CSI feedback. During the report, RS or resources within the same RU may be valid for CSI measurement. At least, all the resources in a RU may be valid from any operation within the RU. However, this approach may lead inefficiency when the size of RU is relatively large (e.g. 2 or 3 subframes). Thus, definition of RU may be applied only to certain cases, e.g. specific use cases or specific size of RUs (e.g. URLCC).

If the size of RU is rather fixed (e.g. options (1) or (2) describe above are used), the size of RU and reference timing may be tied as follows.

RU may be defined in a fixed subframe boundary, and the location of RU may vary within a subframe depending on timing advance (TA), the size of RU, etc.

Figure 7:
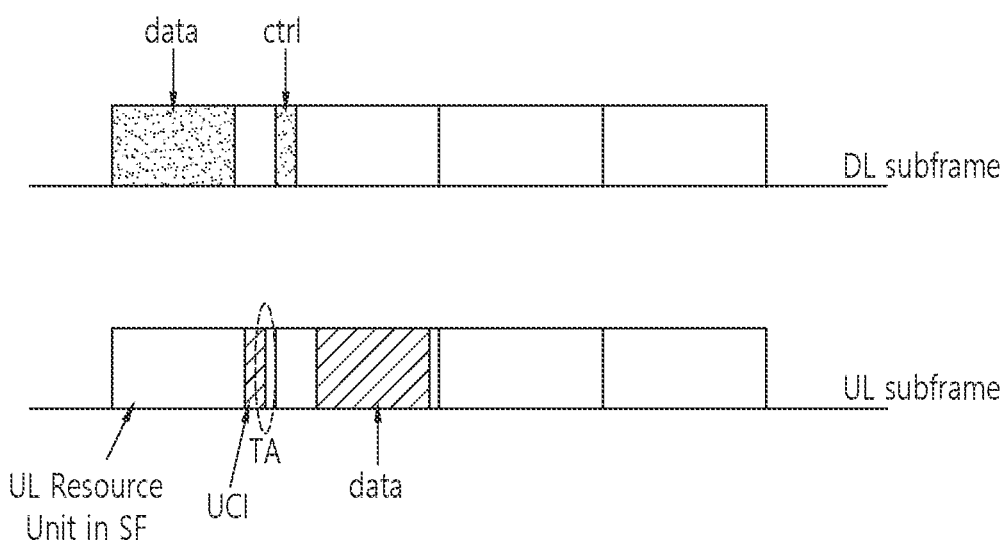
FIG. 7 shows an example of timing of resource unit according to an embodiment of the present invention.

FIG. 7 shows an example of timing of resource unit according to an embodiment of the present invention. Referring to FIG. 7, DL and UL subframe boundary is aligned. Further, DL RU for data/control is fixed in first part of subframe. UL RU for UCI/PUSCH is fixed in the second part of subframe depending on the TA (and others).

Alternatively, subframe boundary may be shifted to align starting of DL RU at the beginning of the subframe, and ending of UL RU at the ending of the subframe.

Figure 8:
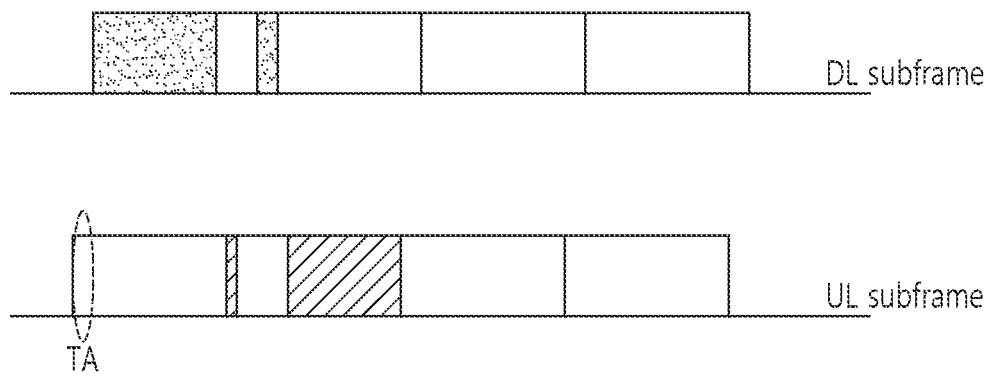
FIG. 8 shows another example of timing resource unit according to an embodiment of the present invention.

FIG. 8 shows another example of timing resource unit according to an embodiment of the present invention. Referring to FIG. 8, subframe boundary is shifted. Accordingly, DL RU is aligned with the beginning of the subframe, and UL RU is aligned with the ending of the subframe.

The above two approaches may be used in combination as well. For example, timing such as TA may be aligned by shifting subframe boundary of UL, whereas some other delay such as UL TX offset, or ACK/NACK offset may be indicated/applied dynamically by shifting UL RU. In other words, RU in a subframe may be floated based on different indication mechanism. Different indication/value may be applied differently between the first and second approach. Subframe boundary may be shifted for long-term timing or UE-specific timing values, and starting position of RU may be adjusted within a subframe based on ACK/NACK offset or other UL offset which may be semi-statically or dynamically configured. Without implicit indication, UL RU may be adjusted by determining the starting position of RU based on the end of DL control channel or DL data channel or the length of scheduled UL data channel. For example, if GP is fixed and configured per UE, depending the ending position of control and/or data, the starting position of UL RU may be defined as (ending position of previous channel+GP). Optionally, some additional latency which may be configured by the network or implicitly determined by data scheduling or dynamically indicated may be considered.

More specifically, when options (1) or (2) described above are used (generally, it may be applied to other cases as well), the starting time of PUSCH and/or UCI may vary depending on UE processing time on UL grant and/or processing time on corresponding DL data. To allow lower latency and finish feedback and/or UL transmission as quickly as possible, each of DL subframe, UL subframe, or DL/UL subframe may have the following options.

DL only: where only DL portion is present in a subframe without any UL transmission
DL burst+early termination gap+self-contained gap for DL subframe, unused gap (due to DL control/data transmission)+UL burst+GP+early termination gap for UL subframe, DL burst+GP+UL burst+early termination gap for DL/UL subframe
UL only (+GP): where only UL portion is present in a subframe
DL only+early termination gap for DL subframe, unused gap (due to DL control/data transmission)+UL burst+early termination gap for UL subframe
DL only+self-contained gap for DL subframe, unused gap (due to DL control/data transmission)+UL burst+early termination gap for UL subframe
Unused gap (due to UL control/data transmission)+self-contained gap+DL burst+early termination gap for DL subframe, UL burst+self-contained-gap+unused gap (due to DL control transmission)+early termination gap for UL subframe, UL burst+GP+DL+early termination gap for DL/UL, SL TX+GP+SL RX+early termination gap for sidelink subframe.

Here, GP may refer timing needed for timing advance and/or transient period and/or DL/UL switching latency. DL burst may include DL duration which may include either DL control portion or DL control+data portion. UL burst may include UL duration which may include either UL control portion or UL data+UL control. Early termination gap may include a gap to finish UL transmission quicker than subframe boundary to reduce the latency or allow the eNB to process received HARQ-ACK and prepare retransmission in the next subframe/TTI. The termination gap may be determined based on the mechanisms mentioned in the description or higher layer configured or implicitly determined. For example, the duration of the early termination gap may be determined as (subframe duration-self-contained RU size).

Further, self-contained gap may be used to define a gap to allow ACK/NACK transmission or PUSCH transmission or corresponding UL grant transmission within the same subframe. In each pair of channels to occur in the same subframe or TTI, necessary gap may be accommodated to allow processing latency and others. For example, between PDSCH and ACK/NACK transmission, self-contained gap may include decoding latency+ACK/NACK encoding latency+power adjustment latency (or related RF latency)+ACK/NACK transmission latency+timing advance. For another example, between UL grant and PUSCH, the self-contained gap may include control decoding latency+PUSCH encoding latency+RF latency+PUSCH transmission latency. The self-contained gap may be configured per UE or implicitly determined, e.g. based on TBS size scheduled in PDSCH.

To allow all operation within a subframe or TTI, if the TTI length is L, the DL burst duration D may be L-S, where S is the self-contained gap. D and S may impact to each other, and may be determined implicitly based on scheduling. In case of sidelink subframe or UL subframe, self-contained gap may be defined for destination's processing time to prepare ACK/NACK, TA, RF latency, ACK/NACK transmission, similar to the case between PDSCH and ACK/NACK. For sidelink operation, one sidelink operation may be partially performed such that ACK/NACK transmission may also be achieved within the same TTI. In this case, it's somewhat challenging to configure or implicitly determine the self-contained gap. In this case, based on the worst case or known value, the self-contained gap may be configured by higher layer.

By the self-contained gap, the second channel transmission may end at the TTI or subframe boundary, and the self-contained gap may allow necessary latency to get second channel transmission completed. On the other hand, the early termination gap may allow that second channel transmission may be finished earlier than the subframe boundary. Two gaps may be used as one gap value, which may be called as 'SpecialGap' in perspective of DL/UL subframe. The SpecialGap may not be used either for DL or UL. For the corresponding first and second channel, it may not prevent from utilizing more than one pairs of channels transmitted in the same subframe in perspective of UE. For example, between PDSCH and ACK/NACK transmission, in perspective of DL subframe, the SpecialGap may be placed after PDSCH transmission (or the size of PDSCH transmission may be reduced) such that it allows sufficient UE processing time to prepare/send ACK/NACK transmission in the same subframe. If the UE requires less processing time than the SpecialGap, the UE may start its transmission as early as possible, and then reserve some part of the SpecialGap in the end after UL transmission (e.g. ACK/NACK transmission). Between UL grant and PUSCH, the SpecialGap may be used to determine PUSCH transmission duration. PUSCH transmission may start as quickly as possible, and the overall duration may be determined based on the SpecialGap. To allow efficient handling among different combinations of channels, it may be more desirable to introduce the early termination gap. Lastly, the early termination gap may be defined as the configured RU, which is determined implicitly or explicitly.

The self-contained gap and/or early termination gap may be UE-specifically or cell-commonly configured. The early termination gap and self-contained gap may be combined.

Figure 9:
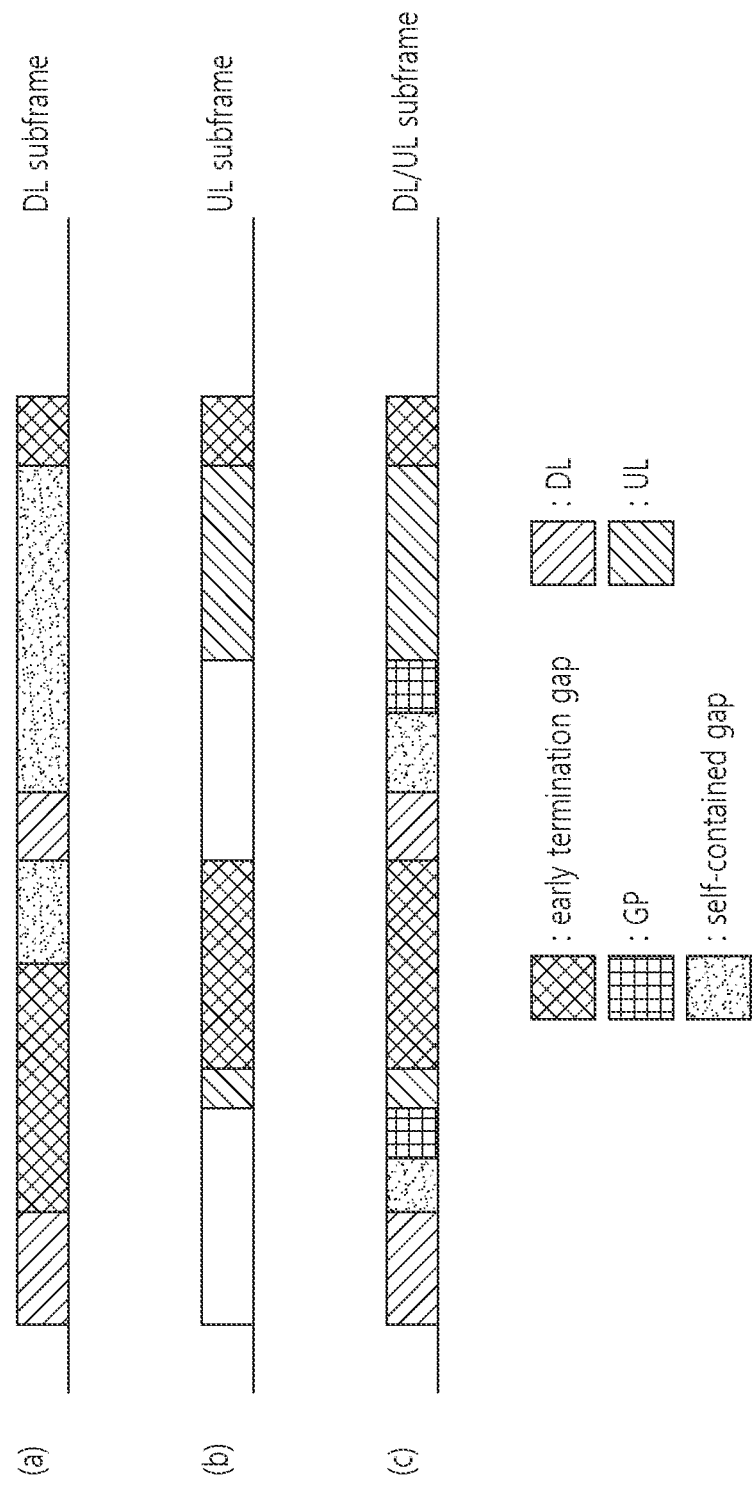
FIG. 9 shows an example of an early termination gap and a self-contained gap according to an embodiment of the present invention.

FIG. 9 shows an example of an early termination gap and a self-contained gap according to an embodiment of the present invention. Referring to FIG. 9-(a), a first DL subframe consists of DL burst+early terminal gap+self-contained gap. A second DL subframe consists of DL burst+self-contained gap+early terminal gap. Referring to FIG. 9-(b), a first/second UL subframe consists of an unused part+UL burst+early terminal gap. Referring to FIG. 9-(c), a first/second DL/UL subframe consists of an DL burst+self-contained gap+GP+UL burst+early termination gap.

In one use case, the early termination gap before end of UL subframe may allow fast retransmission according to the following procedure.
1st subframe: DL control+DL data (initial)+GP+ACK/NACK (NACK)+early terminal gap (for eNB processing)
2nd subframe: DL control+DL data (retransmission)+GP+ACK/NACK (ACK)+early terminal gap (for early termination)

That is, the early termination gap used in 1st subframe may allow eNB processing for the fast retransmission, and the early termination gap used in 2nd subframe may allow early termination. This may be effective to achieve high reliability of HARQ-ACK retransmission. Further, this may be effective in case that multiple retransmissions are assumed to achieve target reliability where as fast as (retransmission in the next subframe/TTI) retransmission is necessary.

More generally, the subframe type may be as follows in unpaired spectrum. In paired spectrum, either UL or DL may be unused or DL or UL, respectively. Sidelink may be used in either DL or UL.

(1) Case 1: DL+Gap2+UL (or UL+Gap2+DL or SL+Gap2+SL).
   The gap2 may be only GP or GP+self-contained-gap.
(2) Case 2: DL+Gap2+UL+Gap3 (or UL+gap2+DL+Gap3 or SL+Gap2+SL+Gap3).
   Gap2 may be same as Gap2 in Case 1.
   Gap3 may be the early termination gap or intentionally blank.
(3) Case 3: Gap1+DL+Gap2+UL (or Gap1+UL+Gap2+DL or Gap1+SL+Gap2+SL)
   The Gap1 may be left intentionally (such as for interference, TTI alignment, listenbefore-talk (LBT), filtering switching latency, etc.) or self-contained-gap.
   Gap2 may be same as Gap2 in Case 1.
(4) Case 4: Gap1+DL+Gap2+UL+Gap3
   Gap½ may be same as Gap½ in Case 2.
   Gap3 may be the early termination gap or intentionally blank.
(5) Case 5: DL or SL or UL
(6) Case 6: Gap4+DL or Gap4+UL or Gap4+UL
   Gap4 may be unused for some other purpose, e.g. interference measurement, forward compatibility, SL resource allocation to consider DL.
(7) Case 7: DL+Gap5 or UL+Gap5 or SL+Gap5
   Gap5 may be unused for some other purpose, e.g. interference measurement, forward compatibility, SL resource allocation to consider DL.
(8) Case 8: Gap4+DL+Gap5 or Gap4+UL+Gap5 or Gap4+SL+Gap5

Depending on configuration/deployment, gap value may be zero. Within a subframe, multiple mini-subframe with a case mentioned above may be possible. One TB may be transmitted over multiple min-subframe which may be interrupted or punctured by the gap or UL in between consecutive DL portions (similar for UL as well).

One example of concurrent DL and UL transmission in a subframe is to have DL control+DL data+GP+UL data+UCI+UL data. In other words, gap may be replaced by other transmissions. The first UL data portion and second UL data portion may be different. Even if it is identical, due to power change in the middle (if any), demodulation reference signal (DM-RS) may be transmitted separately in each UL data portion. The UCI portion may be placed in the middle of subframe for possible retransmission gap. The size of DL data+GP may be larger than DL control decoding latency+ UL data encoding latency+TA+DL−UL switching time. The size of GP+first UL data may be larger than data decoding latency+ACK/NACK encoding latency+TA+DL−UL switching time. If CSI is triggered, CSI may be transmitted via UCI portion to allow more processing budget. Or, the CSI may be transmitted in the second UL data portion to allow more processing time. For power headroom reporting (PHR), etc., where inter-layer processing is necessary, more processing time may be considered or postponed to the next subframe for transmission. Similar to CSI, it may be transmitted over UCI portion or second UL data portion. If a UE is scheduled with only UL transmission, DL data portion may also be used for GP. To support this, UCI portion may be anywhere (which may also be scheduled dynamically by downlink control information (DCI)) and UL transmission may be divided into two UL data portions.

In terms of indicating ACK/NACK transmission, UL data transmission, the following approaches may be considered.

Implicit determination: The starting timing of each transmission may be fixed relatively to the end of data or UL grant transmission. Or, the starting timing of each transmission may fixed absolutely, e.g. HARQ-ACK transmission in the last OFDM symbol in the subframe (if single symbol transmission is assumed) and UL data transmission at the second last OFDM symbol in the subframe.

Figure 10:
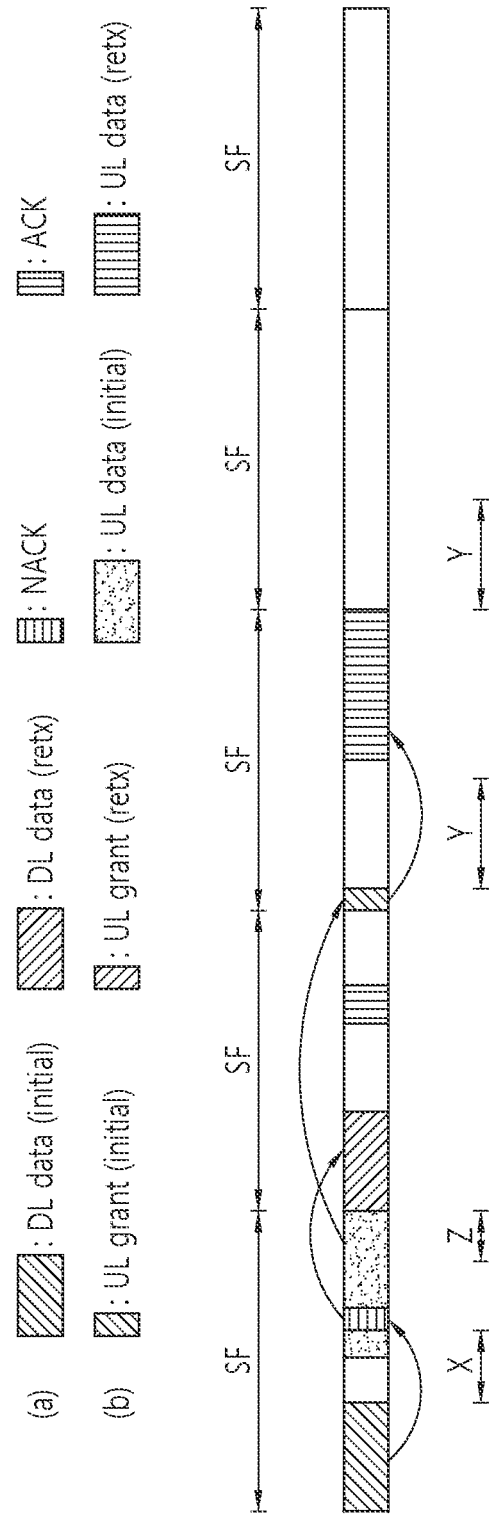
FIG. 10 shows an example of starting timing of transmission according to an embodiment of the present invention.

FIG. 10 shows an example of starting timing of transmission according to an embodiment of the present invention. Referring to FIG. 10, ACK/NACK transmission timing may be fixed relatively to the end of DL data transmission, i.e. X symbols. UL data transmission timing may be fixed relatively to the end of UL grant transmission, i.e. Y symbols. X or Y may be always fixed. Or, X or Y may be varied, e.g. depending on TBS or based on size of RU defined in the present invention.

Explicit determination: The starting time of each transmission may be explicitly indicated, and may be jointly indicated with mode of transmission. The mode of transmission may indicate one of self-contained subframe mode or across subframe mode. The self-contain subframe mode may refer the transmission mode where HARQ-ACK or UL data is transmitted in the same subframe, and across subframe mode may refer that the transmission is done in different subframe. Alternatively, the mode of transmission may be implicitly determined based on mechanism mentioned in the present invention. Based on the mode of transmission, the offset or timing value may be applied across OFDM symbols or mini-subframe (self-contained subframe mode) and across subframes (across subframe mode).

If options (3) or (4) described above are used, some combinations may include DL and UL portions in a RU. The present invention focuses on two cases, the first case is DL control+DL data+ACK/NACK transmission (early termination of one-way transmission without assuming HARQ) and the second case is UL grant+UL data+ACK/NACK transmission (early termination of one-way transmission without assuming HARQ). However, similar mechanism may be applied to other cases. The third case may be DL control+DL data+ACK/NACK transmission+DL control+DL data+ ACK/NACK transmission (initial & retransmission, early termination of one-way transmission with assuming one retransmission). This may be expanded to multiple retransmission cases without loss of generality. The fourth case may be DL control+PUSCH+DL control (initial PUSCH+ ACK). The fifth case may be DL control+PUSCH+DL control+PUSCH+DL control (initial/retransmission PUSCH+NACK/ACK)

In determining the size of size for these cases, control reception/processing, data reception/processing, ACK/NACK preparation, and TA should be considered.

Figure 11:
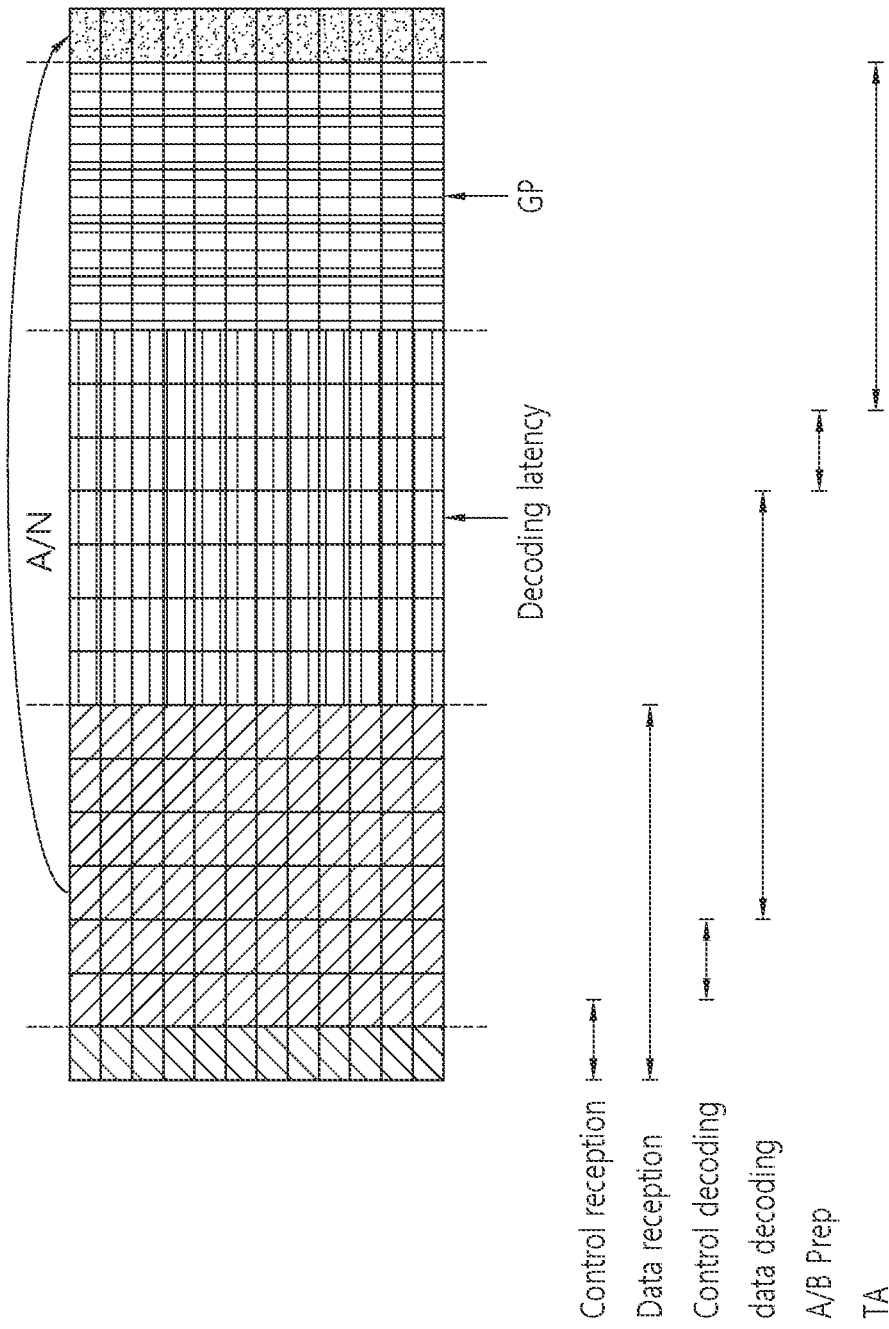
FIG. 11 shows an example of determining size of resource unit according to an embodiment of the present invention.

FIG. 11 shows an example of determining size of resource unit according to an embodiment of the present invention. FIG. 11 corresponds to the first case, i.e. DL control+DL data+ACK/NACK transmission. Here, data reception time and data decoding time (and potentially control reception/decoding time) may vary which may impact the overall total latency. Accordingly, the size of RU for the first case may vary with the scheduled DL OFDM symbols and/or TBS. For the second case, it may be dependent on the schedule UL TBS (encoding latency) and control reception/decoding time. The third case is to allow eNB processing to prepare retransmission as quickly as possible such that ACK/NACK transmission can be early started. As the size of RU may vary, it is necessary to tie the size of RU with reference timing.

Figure 12:
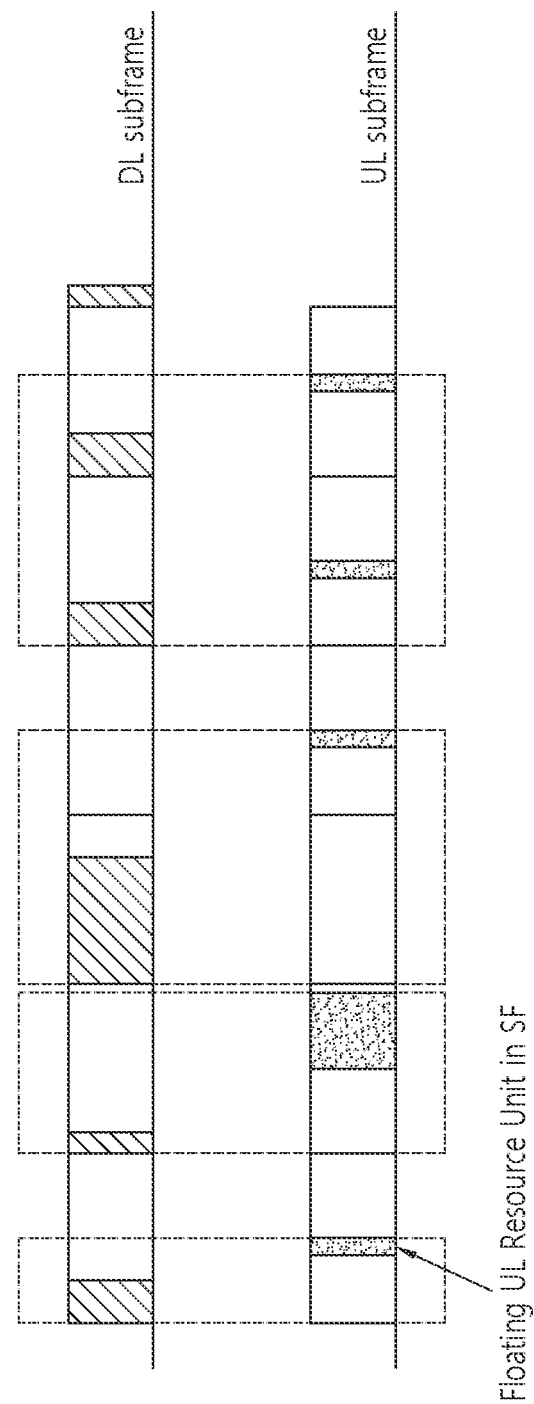
FIG. 12 shows an example of floating resource unit according to an embodiment of the present invention.

FIG. 12 shows an example of floating resource unit according to an embodiment of the present invention. FIG. 12 shows the size of RU for the first case (first/third rectangular), which is dependent on its scheduled data size, the size of RU for the second case (second rectangular), and the size of RU for the third case (fourth rectangular).

Even though the example above shows non-overlapped case among RUs, RUs may be overlapped with each other. For example, both UL grant and DL scheduling DCI may be scheduled from the same control region. In this case, the UE may need to handle two different RUs, and potential collision may be handled by the network scheduling. For example, if collision occurs, higher priority channel may puncture lower priority channels in perspective of UE (e.g. ACK/NACK may puncture PUSCH or DL data transmission). For example, in view of FIG. 12, if the first and second rectangular occur at the same time, it may be possible that ACK/NACK transmission may occur in the middle of UL data transmission. Similar to the case where short TTI and long TTI PUCCH/PUSCH collide, this case may be handled by either dropping data channel or puncturing data channel or concurrent transmission, etc. If Dl data transmission is overlapped with UL transmission, the direction of ACK/NACK or UL or DL may be defined based on priority.

Depending on which RU is defined, determination of e.g. ACK/NACK transmission from UE may be different. If the third case is used, it may be configured by the network when to transmit ACK/NACK, and the eNB may need to make it sure that a UE may have sufficient time to prepare ACK/NACK transmission. If the first case is used, it may be dynamically adapted. Depending on the ACK/NACK transmission timing+eNB processing latency, retransmission may occur in the middle of subframe rather than from the beginning of subframe. In other words, in perspective of transmission of each channel, at least one of the following rules may be considered, partially or fully.

Initial DL control/DL transmission may occur from the beginning of subframe (unless a gap is placed for LBT or some other purpose in the beginning of subframe)

ACK/NACK transmission may occur at the configured starting time if the ACK/NACK transmission start time is defined by the network. Or, ACK/NACK transmission may occur at the time when a UE is ready to transmit ACK/NACK if the ACK/NACK transmission timing may be flexible.

DL control/DL data retransmission may occur similar manner to initial transmission. Or, DL control/DL data retransmission may occur when the eNB is ready to transmit DL control/DL grant. It may be assumed that the latency between ACK/NACK transmission to the next retransmission of DL grant is known to the UE.

Initial UL grant may occur from the beginning of subframe (unless a gap is placed for LBT or some other purpose in the beginning of subframe)

The starting time of PUSCH may be fixed by higher layer. Otherwise, the starting time of PUSCH may be indicated by DCI (either starting or ending time)

DL control transmission may be configured to monitor every subframe (or mini-subframe) (i.e. higher layer configured with different periodicity or fixed). For retransmission (either always or configured by the network), control channels may occur in the middle of subframe. For UL control, a position of ACK/NACK transmission may be configured semi-statically or fixed. More generally, ACK/NACK transmission may occur in the middle of subframe at least for initial transmission. For ACK/NACK transmission corresponding to retransmission, it may occur in the configured position (or follow ACK/NACK timing of initial transmission). More specifically, configured/fixed timing may be used for regular usage scenarios such as eMBB/mMTC, whereas floating timing of ACK/NACK transmission and DL control may be used to support low latency applications.

3. Approaches to Reduce U-Plane Latency (1) Without HARQ-ACK Retransmission

To address U-Plane latency without HARQ-ACK retransmission, latency between control and data transmission may be important. For this, first and second case mentioned above may be important. In this case, early termination of data transmission may seem more relevant.

(2) With HARQ-ACK Retransmission

To address U-plane latency with HARQ-ACK retransmission, latency between control and data in consideration of retransmission may be considered which are covered in third, fourth, and fifth cases. To support this, the following may be considered.

Option 1: Fixed initial transmission position+floating retransmission position+floating NACK transmission position+fixed ACK transmission position Fixed initial transmission position may be higher layer configured or fixed. The floating retransmission position may be defined by processing latency, and known each other between source and destination by a rule or configuration. The floating NACK transmission position may be defined by processing latency, and known each other between source and destination by a rule or configuration.

Option 2: Fixed initial transmission position+floating retransmission position+floating NACK transmission position+floating ACK transmission position Option 3: Fixed initial transmission position+fixed retransmission position+fixed NACK transmission position+fixed ACK transmission position The fixed position may be represented as a subframe type mentioned above in the description where e.g. to allow eNB processing to reduce retransmission latency. The fixed position of ACK/NACK transmission may be earlier than the UL subframe boundary, which may be represented as the early termination gap.

4. Short TTI Formation

To support low latency, one subframe may be partitioned into multiple short subframe or short TTIs. If short subframe is used, the short subframe may have one or zero GP. In this case, with multi-TTI scheduling on DL/UL, data size may vary and ACK/NACK transmission may be determined per short subframe/TTI level to allow fast feedback.

However, one drawback with this approach is that it may not allow more than one DL control channel monitoring which may be supported by short TTI or TTI shortening. To support this, one mitigation is to allow DL monitoring if ACK/NACK transmission is completed before a given set of starting subframes of control channel monitoring. For example, RU for control channel may be defined as smaller size and multiple RUs may be defined in a subframe (same as TTI shortening), and control channel monitoring may occur only if a UE does not have any data to receive or any UL transmission at the starting positions. Potential starting positions for control channel monitoring may be fixed as OFDM symbol 0 and 7 (the first OFDM symbol in every 7 symbol).

5. RU Formation

By allowing flexible/floating RU based on UE processing, it may become challenging to align DL and UL portions in perspective of network, and it may also become challenging to perform inter-cell interference coordination (ICIC) among neighbor cells. In this sense, still reference DL portions and UL portions within a subframe may be necessary. DL/UL portion of RU may need to be aligned with the reference DL/UL portion unless the network can support full duplex (either by separate DL/UL resource with duplex gap or at the same resource by self-interference cancellation).

For definition of reference DL/UL portion, subframe may be used as a reference timing. That is, DL/UL portion of each subframe is defined, and TA or other long-term values may be addressed by shifting subframe boundary of UL portions.

UL transmission may become possible that UL portion in RU is overlapped with reference UL or GP. If the size of RU is larger than subframe length−2*TA, this implies that UL transmission may occur in different subframe where the corresponding control and/or data is transmitted. To protect potential DL transmission, the size of RU may become "m*subframe−2*TA", where m may be minimum of 2. Thus, this mechanism may be applied only for the case where the size of RU for the first or second case can be fitted within a subframe and the network does not support FDR capability. This may be tied with certain application, or certain numerology or may be configured/enabled/disabled by the network configuration or via initial access procedure. Even the network does not support full duplex capability, if it intends, the network may transmit small size of data in a smaller duration, and allow UE to finish UL transmission as quickly as possible.

Figure 13:
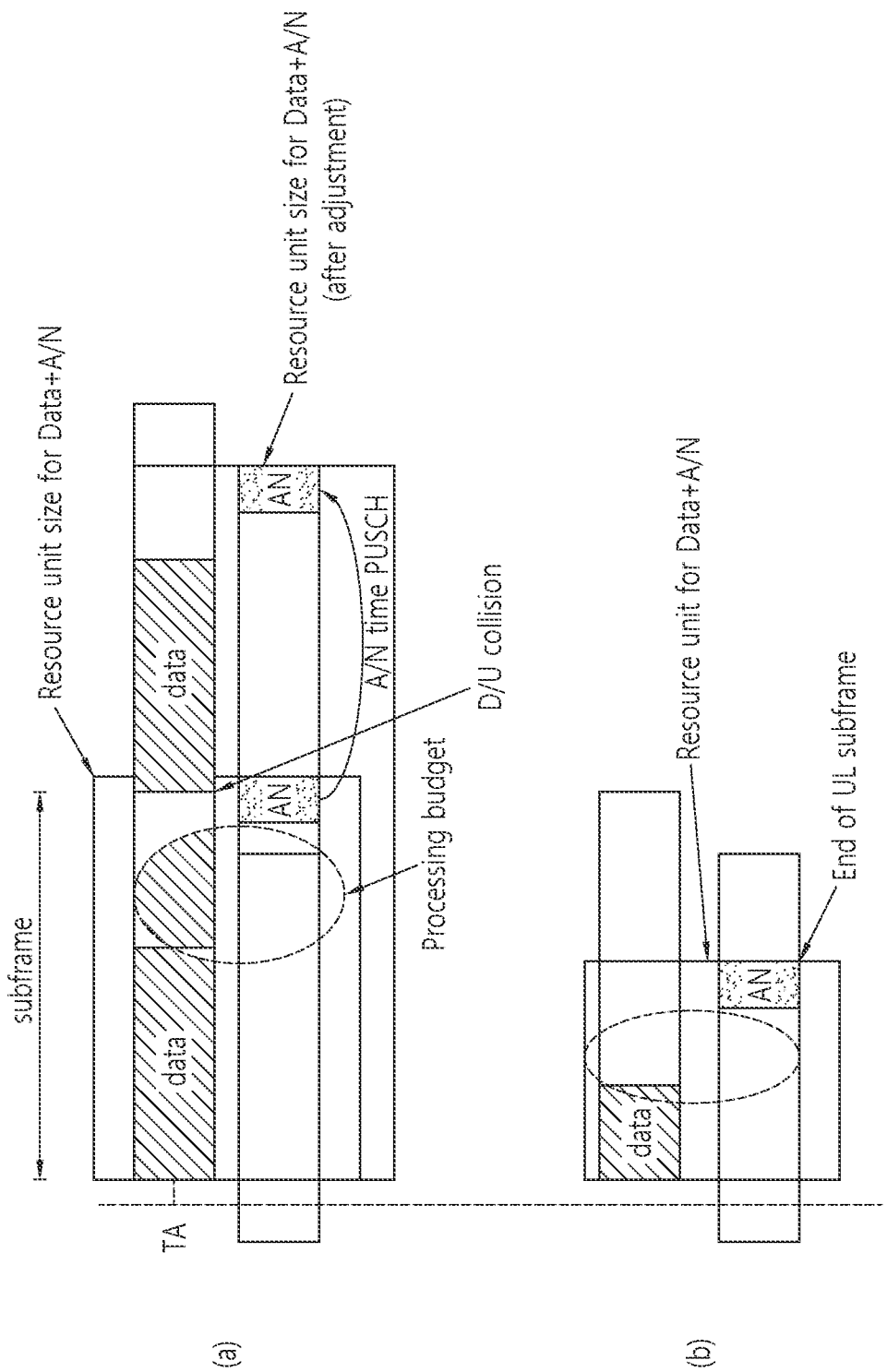
FIG. 13 shows an example of resource unit formation according to an embodiment of the present invention.

FIG. 13 shows an example of resource unit formation according to an embodiment of the present invention. Referring to FIG. 13-(a), the size of RU becomes larger than one subframe considering TA. Further, the timing is pushed to the regular timing (i.e. ACK/NACK at the UL subframe boundary of the next subframe). Referring to FIG. 13-(b), the size of RU becomes smaller than one subframe considering TA. Accordingly, UL subframe duration may be reduced.

In summary, the followings may be considered for frame structure of new RAT to support various use cases with potential lower latency operation.

For eMBB use case (or data rate or TBS is greater than X), basic minimum timing to ACK/NACK transmission since data transmission is n+k (k=2 or 3, where n is the subframe index of end of data transmission)

For URLLC use case (or data rate or TBS is lower than X, but larger than Y), basic minimum timing to ACK/NACK transmission since data transmission is n+k1 (k1=1)

For mMTC or internet-of-things (IoT) use case (or data rate or TBS is lower than Y), basic minimum timing to ACK/NACK transmission since data transmission is n+k2 (e.g. k2=12)

If typically overall latency to prepare ACK/NACK transmission (including control/data decoding and TA) is less than k (or k1 or k2)−delta, UL subframe boundary may be shifted by delta (shifted towards backward) such that actual latency between DL to ACK/NACK transmission can be set to k−delta (or k1−delta or k2−delta).

Figure 14:
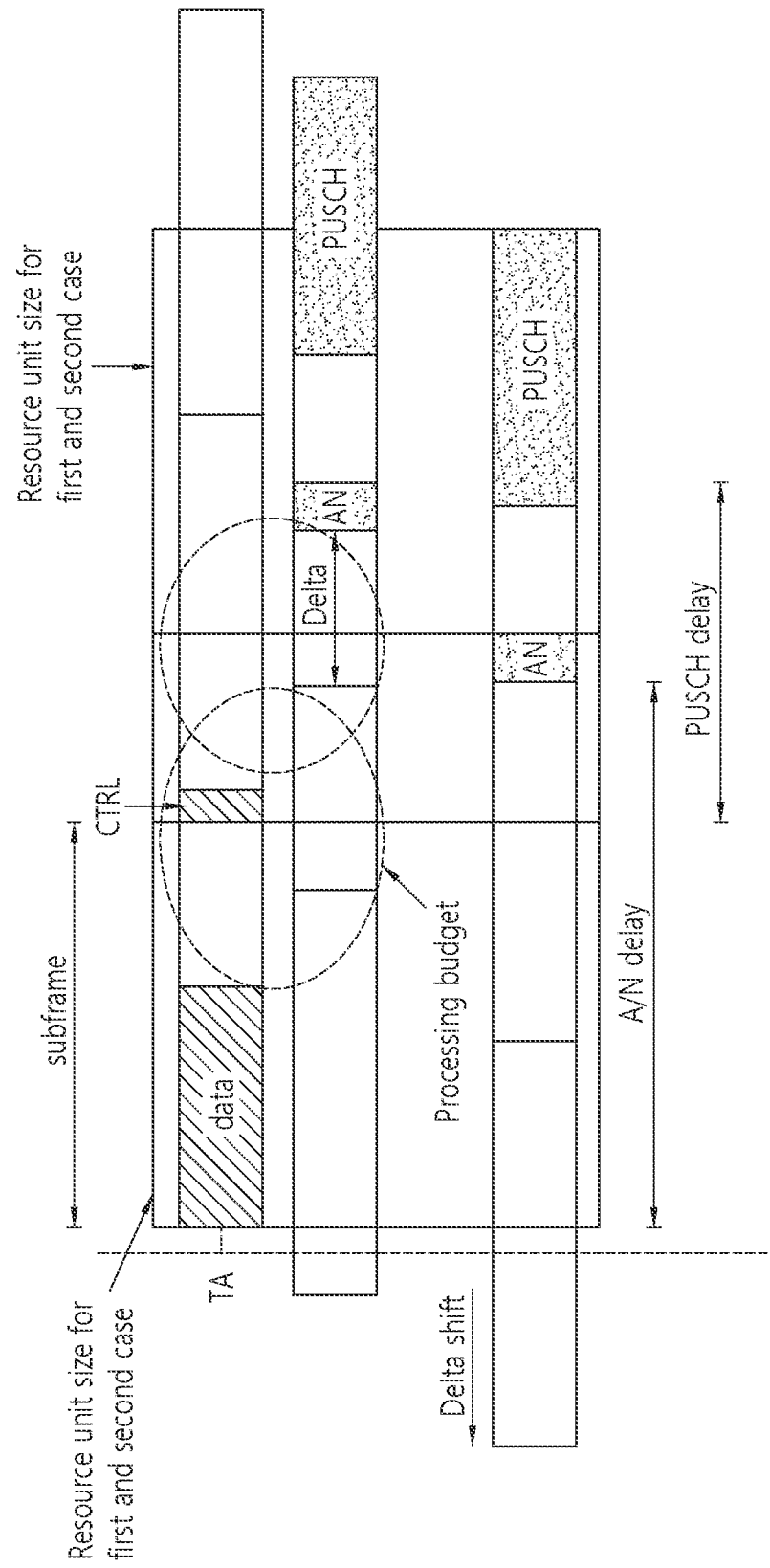
FIG. 14 shows an example of resource unit formation according to an embodiment of the present invention.

FIG. 14 shows another example of resource unit formation according to an embodiment of the present invention. Referring to FIG. 14, UL subframe boundary is shifted by delta towards backward so that actual latency between DL to ACK/NACK transmission is reduced by delta. By shifting UL subframe boundary by delta, the overall latency for ACK/NACK delay and PUSCH delay can be reduced. The shifting may be done per UE-specific manner (if the network supports FDR, this may be easily doable) or per cell-common (based on overall UE capability).

Further, a UE may be able to adjust the size of RU further depending on scheduled data. For example, the size of RU may be smaller than subframe−TA (i.e. data and ACK/NACK may belong to the same subframe), and the UE may adjust its RU size.

Figure 15:
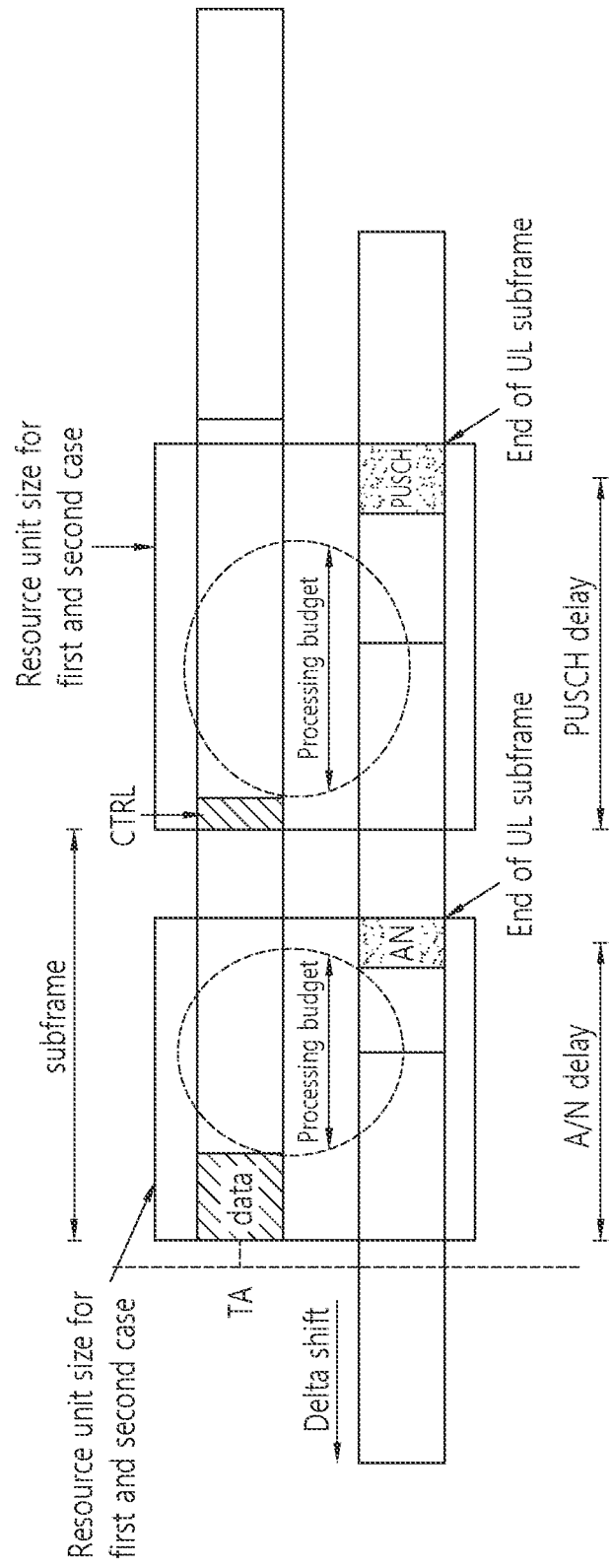
FIG. 15 shows another example of resource unit formation according to an embodiment of the present invention.

FIG. 15 shows another example of resource unit formation according to an embodiment of the present invention. Referring to FIG. 15, by reducing size of data scheduling, the overall processing latency may be reduced, and size of RU for data+ACK/NACK may be smaller than subframe−TA value. In this case, a UE may be allowed to transmit ACK/NACK in early timing at the middle of UL subframe. UL subframe for ACK/NACK transmission may be ended earlier than regular subframe boundary. For PUSCH, processing time may be reduced with smaller size transmission or shorter transmission of PUSCH. In this case, size of RU for control+PUSCH is less than subframe−TA, and it may be transmitted earlier and subframe may be ended earlier than regular subframe.

Now, more details on how to determine the size of RU dynamically depending on TBS are described. The following approaches may be considered.

(1) Per TBS, the size of RU may be determined for data+ACK/NACK (2) Ending symbol of PDSCH may be used (3) Hybrid of (1) and (2)

As mentioned above, if the network supports full duplex capability, RU may be defined for a set of combinations of associated channels (e.g. DL data+ACK/NACK, UL grant+PUSCH, PUSCH+DL ACK/NACK, etc.), and this may be worked regardless of subframe boundary. Also, if the UE supports full duplex capability as well, different RUs may be overlapped with each other among different combination (e.g. RU for DL data+ACK/NACK may overlapped with RU for UL grant+PUSCH). Timing may be operated per each RU independently.

Figure 16:
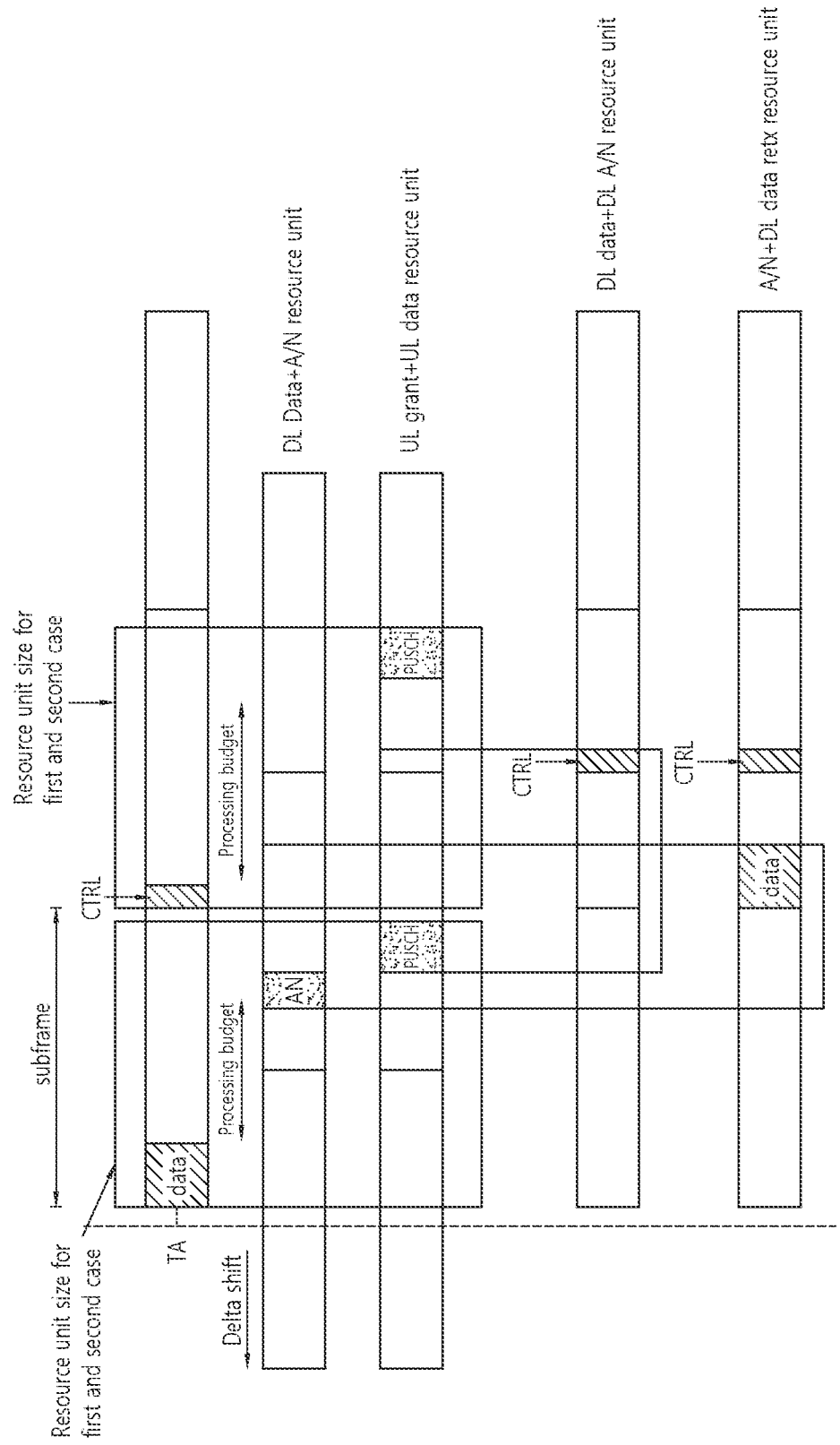
FIG. 16 shows another example of resource unit formation according to an embodiment of the present invention.

FIG. 16 shows another example of resource unit formation according to an embodiment of the present invention. Referring to FIG. 16, RU for DL data+ACK/NACK is overlapped with RU for UL data+ACK/NACK or RU for ACK/NACK+DL data retransmission. Further, RU for UL grant+UL data is also overlapped with RU for UL data+ACK/NACK or RU for ACK/NACK+DL data retransmission.

Further, depending on the size of RU, multiple RU size may be overlapped as long as the same channel transmissions are not overlapped.

Figure 17:
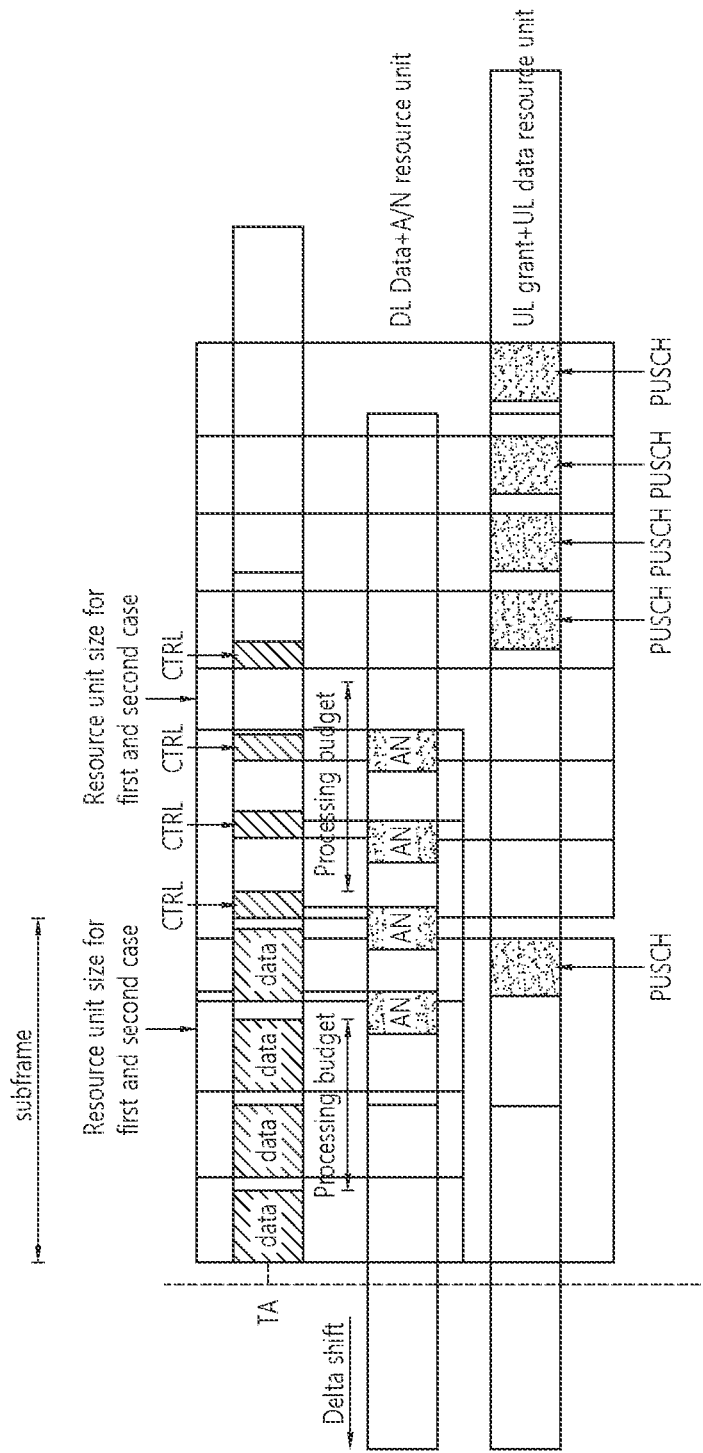
FIG. 17 shows another example of resource unit formation according to an embodiment of the present invention.

FIG. 17 shows another example of resource unit formation according to an embodiment of the present invention. Referring to FIG. 17, multiple RUs of UL grant+UL data (and data+ACK/NACK) are overlapped.

By overlapping multiple RUs, shorter TTI may be achieved. In perspective of UE, how many possible RUs can be overlapped may be configured by higher layer configuration (semi-static or dynamic). For example, explicit starting position for DL control monitoring may be configured. Or, how many possible RUs can be overlapped may be configured implicitly. Depending on the size of RU or depending on maximum size of one channel transmission in a RU, the maximum number of overlapped RUs may be defined. For example, for DL data+ACK/NACK, the length of DL data may define the potentially maximum number of RU size (if it is smaller than subframe/k (k is integer or 2^m), and maximum k number of RUs may be overlapped. Alternatively, the possible starting position of each RU may be fixed (e.g. OFDM symbol 0, 4, 7, 10). If the size of next RU becomes larger (e.g. larger data is scheduled), this mechanism will adapt the maximum autonomously per each RU. Nonetheless, default RU may be defined by some configured or fixed reference. One example of fixed reference is that default control channel monitoring occasion may be configured/fixed as one in every subframe (in the first one or a few OFDM symbols). Another example is data scheduled by semi-persistent scheduling (SPS) or via other semi-static scheduling mechanism. In this sense, the RU which may create some collisions with default RU may not be supported.

Figure 18:
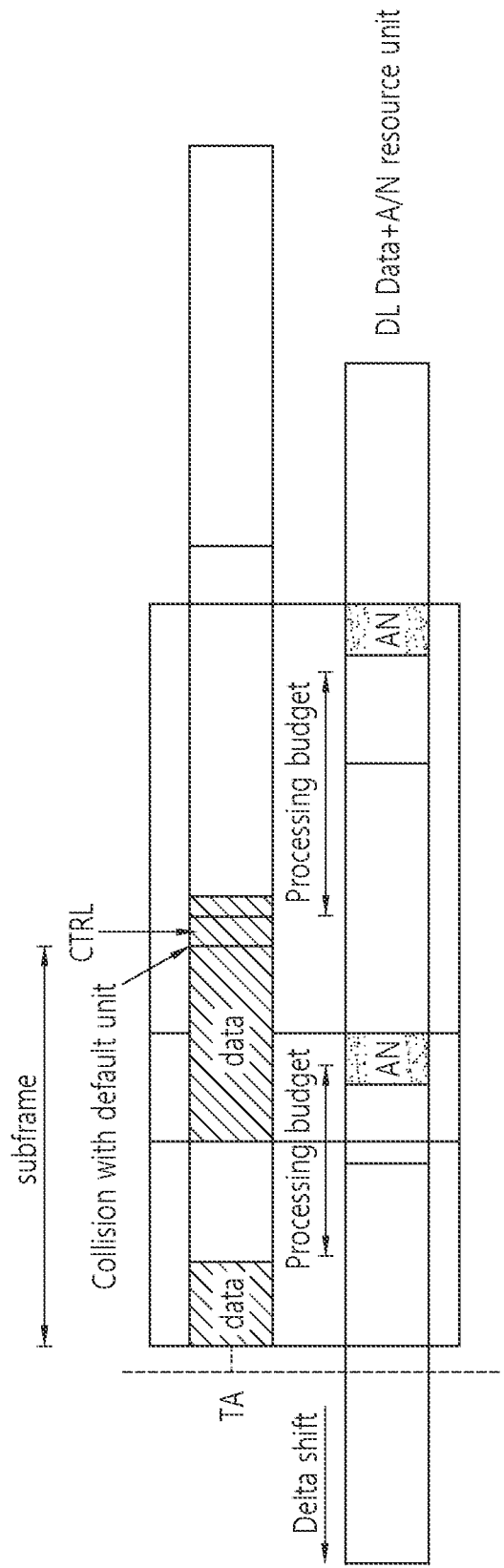
FIG. 18 shows another example of resource unit formation according to an embodiment of the present invention.

FIG. 18 shows another example of resource unit formation according to an embodiment of the present invention. Referring to FIG. 18, RU for DL data+ACK/NACK is collided with default RU, so this embodiment may not be supported.

Alternatively, one channel may not cross subframe boundary of either DL or UL depending on its direction.

Figure 19:
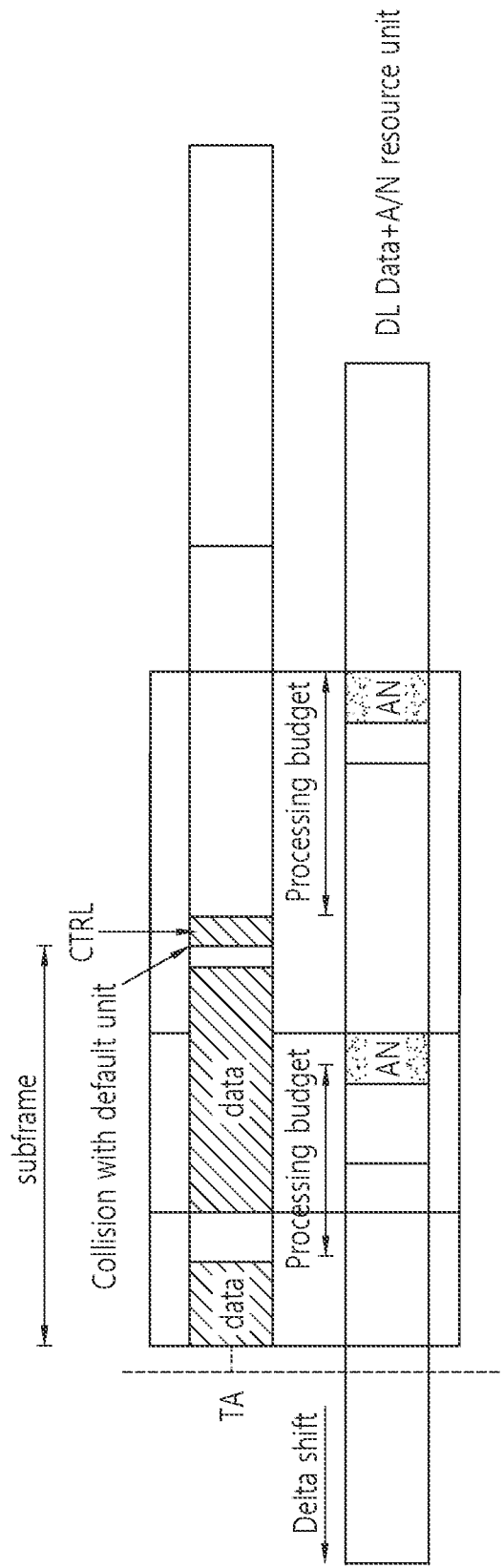
FIG. 19 shows another example of resource unit formation according to an embodiment of the present invention.

FIG. 19 shows another example of resource unit formation according to an embodiment of the present invention. Referring to FIG. 19, even though RU for DL data+ACK/NACK is collided with default RU, subframe boundary is not be crossed. Thus, this embodiment may be supported. Nonetheless, it may be desirable to allow integer number of overlapped RUs within a subframe. In this sense, potentially starting position of the first channel (e.g. DL control in RU for DL data+ACK/NACK) may be implicitly or explicitly defined.

In this description, ACK/NACK transmission was presented with short transmission. However, if ACK/NACK transmission is configured with relatively long (or large number of OFDM symbols), the similar concept may be applied with potentially enlarged RU definition.

When different numerologies are supported by the cell, the following two approaches may be considered.

(1) The same subframe length may be kept based on initial access procedure (assuming the cell supports only one numerology based initial access), and larger subcarrier spacing may be treated with smaller RU. If the network wants to manage two different numerologies at the same time, this may be more effective approach as resource unit size would be different per UE/per subband. The subframe duration may be defined by initial access (or numerology used in initial access) which may be reconfigured by the network after initial access or during the initial access.

Figure 20:
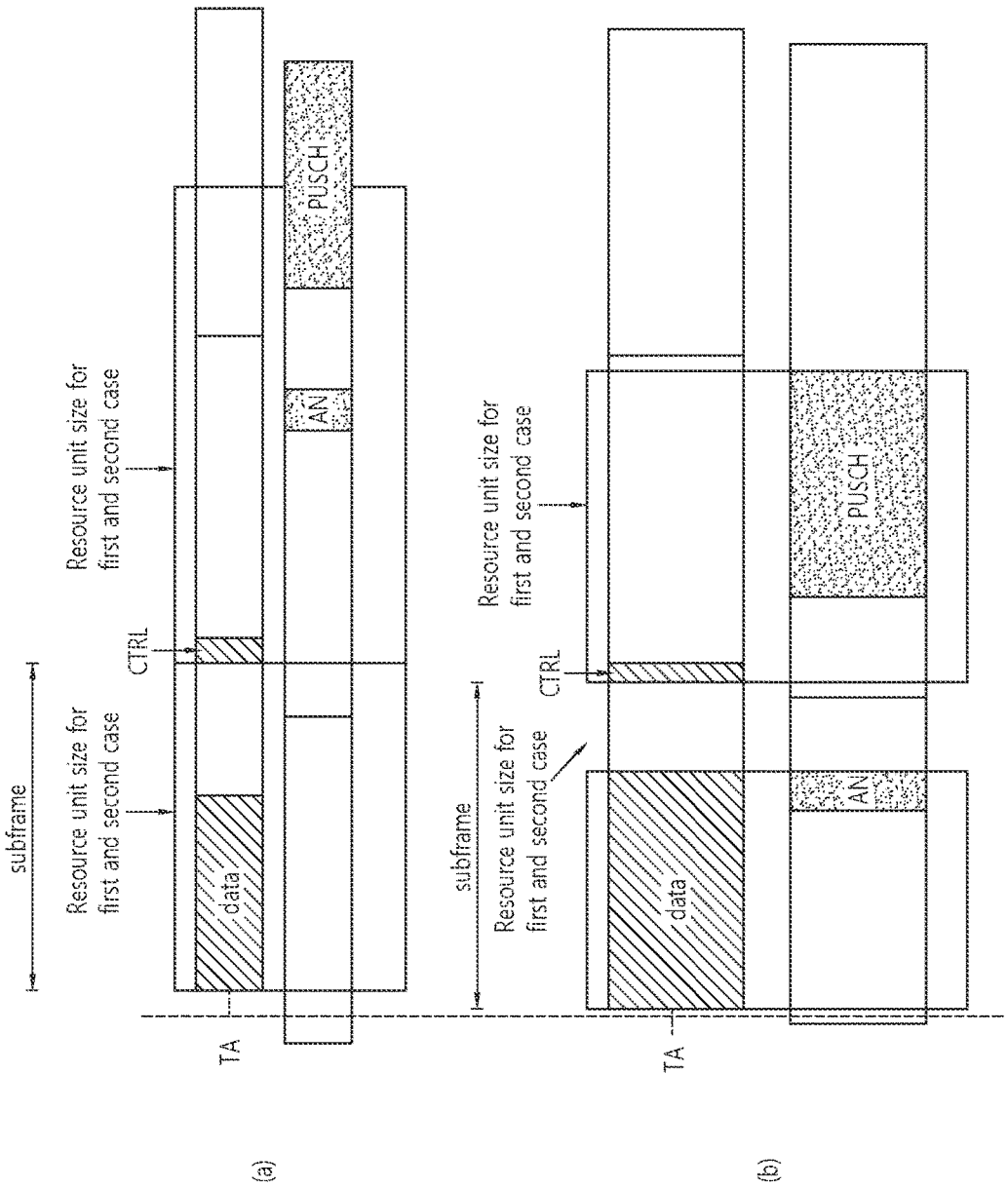
FIG. 20 shows another example of resource unit formation according to an embodiment of the present invention.

FIG. 20 shows another example of resource unit formation according to an embodiment of the present invention. Referring to FIG. 20, FIG. 20-(a) shows RUs for numerology 1, and FIG. 20-(b) shows RUs for numerology 2. Even though different numerologies are supported by the cell, the same subframe length is kept based on initial access procedure.

Alternatively, the subframe may be changed per each numerology, different subframe may be maintained per each numerology.

Figure 21:
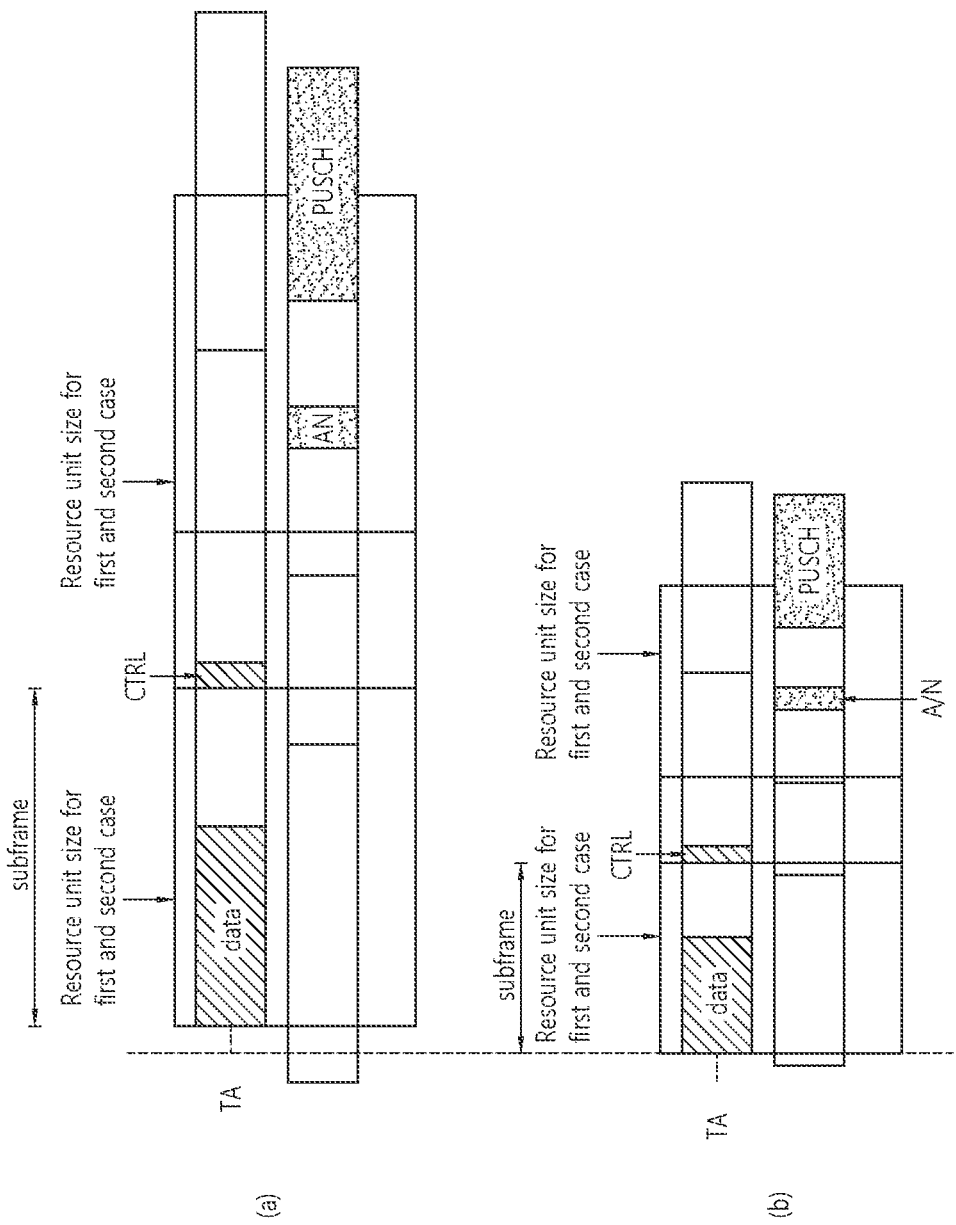
FIG. 21 shows another example of resource unit formation according to an embodiment of the present invention.

FIG. 21 shows another example of resource unit formation according to an embodiment of the present invention. Referring to FIG. 21, FIG. 21-(a) shows RUs for numerology 1, and FIG. 21-(b) shows RUs for numerology 2. According to different numerology, the length of subframe may be changed.

6. RU for Sidelink (Direct-to-Direct Communication)

Similar to LTE design, for sidelink communication, overall two approaches may be considered, (1) sidelink communication without involving the network (i.e. direct-to-direct communication), and (2) sidelink communication with involving the network (including network relay, synchronization via network, etc.). Even with the first approach, sidelink UEs may access the network. Even though it may not access the network, basic numerology assumed for sidelink operation for the first case may seem necessary. One example is to fix numerology for sidelink operation regardless of (1) or (2), which may be changed per frequency band. For example, sidelink operation numerology may be fixed as 30 kHz subcarrier spacing for under 6 GHz frequency and 60 kHz subcarrier spacing for above 6 GHz frequency. This frequency may be different from the host eNB if a UE is connected to the network or (2) is used.

To support sidelink operation, thus, multiple operation can be considered.

(1) Alt 1: In perspective of UE, single numerology may be used for sidelink related operation regardless of communication type and/or whether to involve the network or not. In this case, any sidelink related communication including potentially camping-on related initial access procedure may be based on the numerology of sidelink. This may include additional synchronization signal, physical broadcast channel (PBCH), system information block (SIB) transmission from the host eNB to support sidelink operation. This option may be considered if the network or a cell provides two different services with virtually two cells.

(2) Alt 2: Camp-on procedure and/or initial access procedure may be done based on numerology that the host network is based on. After the connection or initialization for sidelink operation, a UE may be reconfigured with numerology of sidelink, and operate with sidelink numerology since then. By this mechanism, depending on UE expected behaviour, if the UE needs to search a cell, the UE may search the cell with expected numerology that the network may provide. For example, if a cell under 6 GHz frequency operates with 15 kHz subcarrier spacing, sidelink UEs may search the cell based on 15 kHz numerology at first. Once a UE performs initialization for sidelink operation, it may be reconfigured with or changed to sidelink numerology. In terms of reconfiguration, it may be configured by SIB broadcast to operate with certain numerology. In out-of-coverage case, default resource pool may be configured with default numerology. Alternatively, different resource pool may be configured with different subcarrier spacing as well.

In this case, it may be up to UE to select which numerology or resource pool to utilize. Or, it may be decided by transmission mode or discovery mode if there are more than transmission/discovery modes available. In summary, resource pool may be configured with default numerology. A UE may be expected to operate with the given numerology at the configured resource.

(3) Alt 3: Sidelink numerology may be defined/different between (1) and (2). For example, for (1), Alt 1 or 2 may be used. For (2), sidelink numerology may be the same as the network supports. In this case, different cells supporting (2) in the same region may use the same numerology. Similar to Alt 2, it may also be reconfigured or the cell may configure multiple resource pools with different numerologies.

If a UE may need to support multiple numerologies either depending on resource pool and/or different TTI length, subframe may be different. In this case, it may be desirable to align its subframe (either shortest subframe or a reference subframe). Or, the same numerology may be used for sidelink operation in the same region, or at least a UE may not be required to operate more than one numerology at a given subband.

Alternatively, for sidelink operation, RU may be defined. Different from communication between eNB and UE, sidelink operation may be based on broadcast or communication without explicit feedback. Thus, minimum TTI length (which a UE transmit/receive sidelink data) may be assumed for resource unit for sidelink operation.

7. Configurability Between Self-Contained Subframes

As HARQ-ACK may be transmitted within the same subframe or across subframes, when explicit HARQ-ACK timing is configured, it needs to be clarified whether it is based on OFDM symbol or mini-subframe or subframe. Even with the same application such as TCP, depending on packet size or characteristics of packet, it may be beneficial to utilize self-contained subframe or same-subframe feedback. Sometimes, it may be more beneficial to use HARQ-ACK timing across subframes. In that sense, the rule to determine this may be necessary. More generally, mechanisms to determine the size of RU mentioned in the description may be applied to determine whether the offset is applied per subframe level or per OFDM symbol or mini-subframe level.

Some examples may be as follows:
Based on scheduled TBS
Based on modulation and coding scheme (MCS)
Based on usage scenario
Based on end position of data transmission
HARQ process ID
Configured HARQ process number
Similar mechanisms are applied also for uplink grant.

Figure 22:
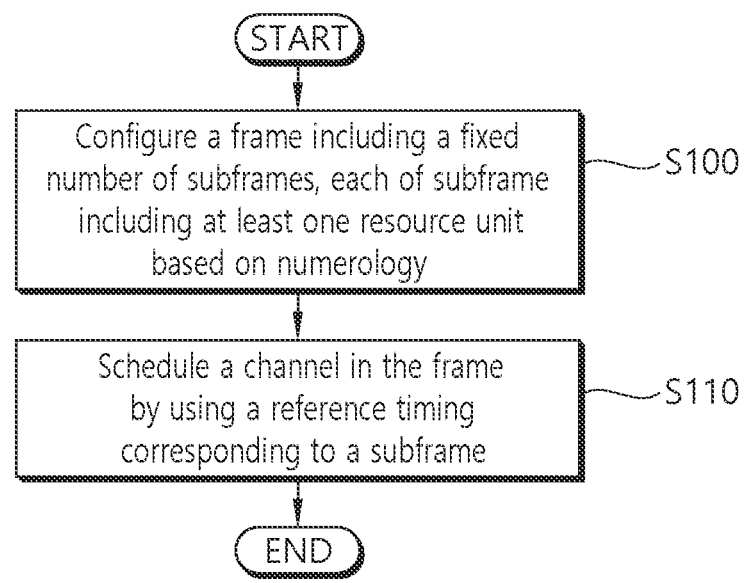
FIG. 22 shows a method for configuring a frame structure by a network node according to an embodiment of the present invention.

FIG. 22 shows a method for configuring a frame structure by a network node according to an embodiment of the present invention. The disclosure of the present invention described above may be applied to this embodiment.

In step S100, the network node configures a frame including a fixed number of subframes, each of subframe including at least one resource unit (RU) based on a numerology. The fixed number of subframes may be 10. The frame including the fixed number of subframes may be configured regardless of numerology. The numerology may include a set of subcarrier spacing and a length of CP. The number of the at least one RU included in each subframe may increase as the subcarrier spacing increases.

Further, the RU may be a time granularity to schedule the channel. A size of RU may be determined separately per DL or UL. Or, a size of RU may be determined separately per channel.

In step S110, the network node schedules a channel in the frame by using a reference timing corresponding to a subframe.

The subframe may be a DL subframe, and may include a DL burst, an early termination gap, and a self-contained gap. Or, the subframe may be a UL subframe, and may include an unused portion, UL burst, a GP, and an early termination gap. Or, the subframe may be a DL/UL subframe, and may include a DL burst, a GP, a UL burst, and an early termination gap. A timing of the channel may be determined implicitly based on a timing of other channel. Or, timing of the channel may be determined explicitly indicated.

Figure 23:
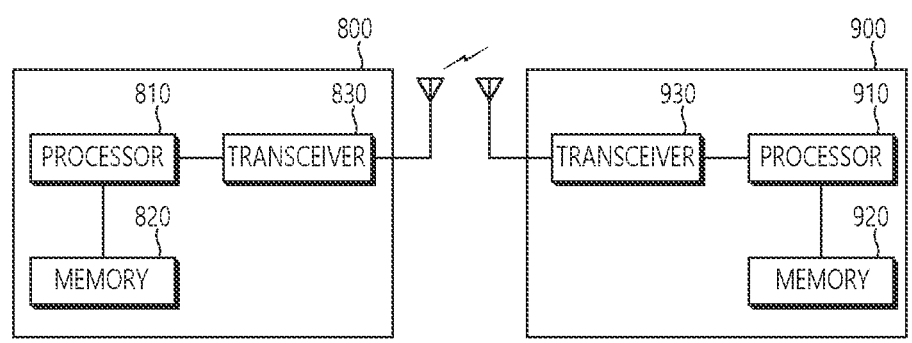
FIG. 23 shows a wireless communication system to implement an embodiment of the present invention.

FIG. 23 shows a wireless communication system to implement an embodiment of the present invention.

A network node 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method performed by a network node in a wireless communication system, the method comprising:
    configuring a frame including subframes, wherein each of the subframes includes at least one resource unit (RU); and
    scheduling a channel in the frame based on the at least one RU,
    wherein the at least one RU is a time granularity to schedule the channel,
    wherein the at least one RU comprises a first RU for scheduling a control channel and a second RU for scheduling a data channel,
    wherein a time duration of the first RU is smaller than a time duration of the second RU,
    wherein the time duration of the first RU and the time duration of the second RU are different per each of the subframes in the frame,
    wherein, based on (i) a subframe index of end of data transmission being n and (ii) a data rate being greater than a first predefined rate: a minimum timing for acknowledgement/negative-acknowledgement (A/N) transmission is configured as n+k, where k is 2 or 3,
    wherein, based on (i) the subframe index of end of data transmission being n and (ii) the data rate being lower than the first predefined rate and greater than a second predefined rate: the minimum timing for A/N transmission is configured as n+k1, where k1 is 1, and
    wherein, based on (i) the subframe index of end of data transmission being n and (ii) the data rate being lower than the second predefined rate: the minimum timing for A/N transmission is configured as n+k2, where k2 is 12.

2. The method of claim 1, wherein a number of the subframes is 10.

3. The method of claim 1, wherein a number of the subframes is fixed regardless of a numerology, and
    wherein the numerology comprises at least one of a subcarrier spacing and an orthogonal frequency division multiplexing (OFDM) symbol length.

4. The method of claim 3, wherein a number of the at least one RU included in each subframe increases as the subcarrier spacing increases.

5. The method of claim 1, wherein the at least one RU comprises a third RU for scheduling a downlink channel and a fourth RU for scheduling an uplink channel, and
    wherein a size of the downlink channel is different from a size of the uplink channel.

6. The method of claim 1, wherein the subframe comprises a downlink subframe including a downlink burst, an early termination gap, and a self-contained gap.

7. The method of claim 1, wherein the subframe comprises an uplink subframe including an unused portion, an uplink burst, a guard period (GP), and an early termination gap.

8. The method of claim 1, wherein the subframe comprises a downlink/uplink subframe, and includes a downlink burst, a guard period (GP), an uplink burst, and an early termination gap.

9. The method of claim 1, wherein a timing of the channel is determined implicitly based on a timing of other channel.

10. The method of claim 1, wherein a timing of the channel is determined by being explicitly indicated.

11. The method of claim 1, wherein, based on a subframe index of end of data transmission for enhanced mobile broadband (eMBB) being n: a minimum timing for A/N transmission is configured as n+k, where k is 2 or 3, wherein, based on a subframe index of end of data transmission for ultra reliable and low latency communication (URLLC) being n: the minimum timing for A/N transmission is configured as n+k1, where k1 is 1, and wherein, based on a subframe index of end of data transmission for massive machine type communication (mMTC) being n: the minimum timing for A/N transmission is configured as n+k2, where k2 is 12.

12. The method of claim 1, wherein, based on overall latency to prepare A/N transmission being less than (k—delta), (k1—delta), or (k2—delta), an uplink subframe boundary for A/N transmission is shifted by delta.

13. A network node configured to operate in a wireless communication system, the network node comprising:
a memory;
a transceiver; and
at least one processor, coupled to the memory and the transceiver, configured to:
configure a frame including subframes, wherein each of the subframes includes at least one resource unit (RU), and
schedule a channel in the frame based on the at least one RU,
wherein the at least one RU is a time granularity to schedule the channel,
wherein the at least one RU comprises a first RU for scheduling a control channel and a second RU for scheduling a data channel,
wherein a time duration of the first RU is smaller than a time duration of the second RU,
wherein the time duration of the first RU and the time duration of the second RU are different per each of the subframes in the frame,
wherein, based on (i) a subframe index of end of data transmission being n and (ii) a data rate being greater than a first predefined rate: a minimum timing for acknowledgement/negative-acknowledgement (A/N) transmission is configured as n+k, where k is 2 or 3,
wherein, based on (i) the subframe index of end of data transmission being n and (ii) the data rate being lower than the first predefined rate and greater than a second predefined rate: the minimum timing for A/N transmission is configured as n+k1, where k1 is 1, and wherein, based on (i) the subframe index of end of data transmission being n and (ii) the data rate being lower than the second predefined rate, the minimum timing for A/N transmission is configured as n+k2, where k2 is 12.

14. The network node of claim 13, wherein a number of the subframes is 10.

15. The network node of claim 13, wherein a number of the subframes is fixed regardless of a numerology, and
wherein the numerology comprises at least one of a subcarrier spacing and an orthogonal frequency division multiplexing (OFDM) symbol length.

16. The network node of claim 15, wherein a number of the at least one RU included in each subframe increases as the subcarrier spacing increases.

17. The network node of claim 13, wherein the at least one RU comprises a third RU for scheduling a downlink channel and a fourth RU for scheduling an uplink channel, and
wherein a size of the downlink channel is different from a size of the uplink channel.

18. The network node of claim 13, wherein the subframe comprises a downlink subframe including a downlink burst, an early termination gap, and a self-contained gap.

19. The network node of claim 13, wherein the subframe comprises an uplink subframe including an unused portion, an uplink burst, a guard period (GP), and an early termination gap.

20. The network node of claim 13, wherein the subframe comprises a downlink/uplink subframe, and includes a downlink burst, a guard period (GP), an uplink burst, and an early termination gap.

21. The network node of claim 13, wherein a timing of the channel is determined implicitly based on a timing of other channel.

22. The network node of claim 13, wherein a timing of the channel is determined by being explicitly indicated.

* * * * *